United States Patent
Tanaka

(10) Patent No.: US 12,482,044 B1
(45) Date of Patent: Nov. 25, 2025

(54) RESTAURANT MANAGEMENT SYSTEM AND RESTAURANT MANAGEMENT METHOD

(71) Applicant: Kura Sushi, Inc., Sakai (JP)

(72) Inventor: Kunihiko Tanaka, Sakai (JP)

(73) Assignee: Kura Sushi, Inc.

( * ) Notice: Subject to any disclaimer, the term of this patent is extended or adjusted under 35 U.S.C. 154(b) by 0 days.

(21) Appl. No.: 18/914,055

(22) Filed: Oct. 12, 2024

(51) Int. Cl.
*G06Q 50/12* (2012.01)
*G06Q 10/02* (2012.01)

(52) U.S. Cl.
CPC ............. *G06Q 50/12* (2013.01); *G06Q 10/02* (2013.01)

(58) Field of Classification Search
CPC ....................................................... G06Q 50/12
See application file for complete search history.

(56) References Cited

U.S. PATENT DOCUMENTS

2020/0031592 A1* 1/2020 Ogawa .................. A47G 23/08

FOREIGN PATENT DOCUMENTS

| CN | 116308893 A | * | 6/2023 | ............ G06Q 50/12 |
| JP | 2004242693 A | * | 9/2004 | |
| JP | 2008293322 A | * | 12/2008 | |
| JP | 5198958 B2 | * | 5/2013 | |

OTHER PUBLICATIONS

Tomohiko Kanai, Sushi Chains Giving Up Conveyor Belt; Some Switching to Touch-Screen Ordering to Reduce Waste, Improve Hygiene, The Japan News, https://japannews.yomiuri.co.jp/society/general-news/20240922-212588/, Sep. 2024 (Year: 2024).*

* cited by examiner

*Primary Examiner* — Rupangini Singh
(74) *Attorney, Agent, or Firm* — Best Mode IP Law, PLLC; Yusuke Hirai

(57) ABSTRACT

A restaurant management system manages a restaurant. The restaurant management system includes: a conveying path that extends along seats for customers in the restaurant and conveys an item; an event execution device that is conveyed on the conveying path in the restaurant and performs an event on the conveying path; and an event control unit that controls the event execution device to perform the event in response to a request by a customer. The event execution device includes a display device that displays a particular image. The event control unit executes an event start step of controlling the display device that is conveyed on the conveying path to display the particular image, as the event, on the conveying path when the event execution device reaches a seat for which the event is to be performed.

11 Claims, 18 Drawing Sheets

FIG. 13

| RESTA-URANT | RESERVATION NO. | DATE AND TIME | NUMBER OF PEOPLE | VIDEO DATA | ITEM 1 | ITEM 2 | ITEM 3 |
|---|---|---|---|---|---|---|---|
| | | | 20240701 RESERVED ITEM LIST | | | | |
| ABC | 101 | 20240701 17:30 | 4 | 101.mp4 | ITEM 1 | | |
| ABC | 102 | 20240701 18:00 | 6 | 102.mp4 | ITEM 1 | ITEM 2 | |
| ABC | 103 | 20240701 19:00 | 4 | 103.mp4 | ITEM 1 | | |
| ABC | 104 | 20240701 19:30 | 3 | 104.mp4 | | | ITEM 3 |

FIG. 15

| CUSTOMER WHO MADE RESERVATION FOR RESERVED ITEM JUST TOOK SEAT | |  |
|---|---|---|
| SEAT | 3 | |
| RESERVED TIME | 20240701 18:00:00 | |
| TIME ON SEAT | 20240701 18:05:31 | |
| VIDEO DATA | 102.mp4 | |
| ITEM 1 | SPECIAL SCATTERED SUSHI | 18:20:31 APPROXIMATE SERVING TIME |
| ITEM 2 | WHOLE CAKE WITH HEART-SHAPED STRAWBERRY | 18:50:31 APPROXIMATE SERVING TIME |
| ITEM 3 | — | |

CONFIRM

CONVEYANCE DIRECTION
UPSTREAM SIDE ────────────────▶ DOWNSTREAM SIDE

RESTAURANT MANAGEMENT SYSTEM AND RESTAURANT MANAGEMENT METHOD

CROSS REFERENCE TO RELATED APPLICATION

This application is based on and claims the benefit of priority from Japanese Patent Application No. 2024-106717 filed on Jul. 2, 2024 and Japanese Patent Application No. 2024-146240 filed on Aug. 28, 2024. The entire disclosure of the above applications is incorporated herein by reference.

TECHNICAL FIELD

The present disclosure relates to a restaurant management system, a restaurant management method, a reservation management device, and a storage medium storing a reservation management program for managing operation at a restaurant.

BACKGROUND

Technologies are known for automatically managing the operation (e.g., reservations) of restaurants. For example, in a reservation system, a customer accesses a predetermined site using a communication terminal, moves to a page for making a reservation, and enters the name of the restaurant and the reservation date and time. A reservation management server extracts reservation status management data for a corresponding date and time, and causes a communication terminal of a customer to display the reservation information on the screen. The customer transmits reservation application information selecting one of displayed available time slots. The reservation management server performs reservation confirmation processing based on the reservation application information. In addition, there has been known a technique for transmitting display data (e.g., image data) conveyed with a food or a drink ordered by a customer to a reservation management server from the customer when a making a reservation and a technique for accepting a reservation of a food or a drink at the same time as making the reservation.

SUMMARY

A first phase of the present disclosure will be described. When a customer makes a reservation for a restaurant, it is convenient for the customer if the customer can reserve a reserved item, which will be provided to the customer in the restaurant in addition to the reservation date and time and the number of people. However, procedures by the customer for making a reservation and confirming whether designated reservation contents are correctly reflected would be more complicated as the amount of reservation contents to be designated by a customer increases. Accordingly, there has been a need for a technology for acquiring multiple pieces of information necessary for operating restaurants from customers by an easy and simple procedure.

A second phase of the present disclosure will be described. In a conventional restaurant management system, it would be difficult to execute an event such as celebrations or other events for a customer at an appropriate timing when the customer who made a reservation comes to the restaurant. Therefore, it would be difficult to fully entertain customers who come to the restaurant.

A typical objective of the present disclosure is to provide a restaurant management system, a restaurant management method, a reservation management device, and a reservation management program that manages a restaurant by solving at least one of the above problems.

In a first aspect of the present disclosure, a restaurant management system includes: a customer terminal that is used by a customer and a reservation management device that is configured to manage reservations for a restaurant. The customer terminal is configured to execute: a sharing establishment step of establishing a sharing state in a communication tool where information is output from a plurality of accounts and shared on a chat screen, wherein information is shared on the chat screen between the customer terminal and an account of the reservation management device in the sharing state; and a designation acceptance step of receiving, on the chat screen, designations by the customer on a plurality of reservation contents when the reservation management device sequentially outputs, on the chat screen, a plurality of pieces of designation request information for requesting the customer to designate each of the reservation contents regarding at least a reservation date and time, a number of people, and a reserved item. A plurality of pieces of reservation information indicative of the plurality of reservation contents received at the designation acceptance step are acquired by sequentially accepting the designations on the plurality of reservation contents at the designation acceptance step.

In a second aspect of the present disclosure, a restaurant management system manages a restaurant. The restaurant management system includes: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event. A seat is assigned to a customer who made a reservation when the customer comes to the restaurant. Seat information indicative of the seat assigned to the customer is associated with reservation information indicative of a plurality of reservation contents for at least a reservation date and time and a number of people. The reservation information is acquired in response to the customer inputting an instruction into a customer terminal used by the customer. The event control unit is configured to execute, based on the seat information, an event start step of controlling the event execution device that is conveyed on the conveying path to start the event on the conveying path when the event execution device reaches the seat assigned to the customer.

In a third aspect of the present disclosure, a restaurant management system manages a restaurant. The restaurant management system includes: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event. The event control unit is configured to execute an event start step of controlling the event execution device that is conveyed on the conveying path to start the event on the conveying path when the event execution device reaches a seat for which the event is to be performed.

In a fourth aspect of the present disclosure, a restaurant management method is executed in a restaurant management system including a customer terminal used by a customer and a reservation management device that manages reservations for a restaurant. The restaurant management method includes: a sharing establishment step of establishing, with the customer terminal, a sharing state in a communication tool where information is output from a plurality of accounts and shared on a chat screen, wherein information is shared on the chat screen between the customer terminal and an account of the reservation management device in the sharing state; and a designation request step of sequentially outputting, with the reservation management device, a plurality of pieces of designation request information requesting the customer to specify each of a plurality of reservation contents for at least a reservation date and time, a number of people, and a reserved item on the chat screen; a designation acceptance step of accepting, with the customer terminal, designations by the customer on the plurality of pieces of the designation request information on the chat screen when the plurality of pieces of the designation request information are output on the chat screen; and a reservation information storage step of acquiring, with the reservation management device, reservation information indicative of the plurality of reservation contents received at the designation acceptance step and of storing, with the reservation management device, the reservation information in a storage device. A plurality of pieces of the reservation information are acquired by the reservation management device by sequentially executing the designation request step and the designation acceptance step on each of the plurality of reservation contents.

In a fifth aspect of the present disclosure, a restaurant management method is executed by a restaurant management system that manages a restaurant. The restaurant management system including: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event, a seat is assigned to a customer who made a reservation when the customer comes to the restaurant. The restaurant management method includes: associating seat information indicative of the seat assigned to the customer with reservation information indicative of a plurality of reservation contents for at least a reservation date and time and a number of people, wherein the reservation information is acquired in response to the customer inputting an instruction into a customer terminal used by the customer; and executing, with the event control unit based on the seat information, an event start step of controlling the event execution device that is conveyed on the conveying path to start the event on the conveying path when the event execution device reaches the seat assigned to the customer.

In a sixth aspect of the present disclosure, a restaurant management method is executed by a restaurant management system that manages a restaurant. The restaurant management system includes: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event. The restaurant management method includes executing, with the event control unit, an event start step of controlling the event execution device that is conveyed on the conveying path to start the event on the conveying path when the event execution device reaches a seat for which the event is to be performed.

In a seventh aspect of the present disclosure, a reservation management device manages reservations for a restaurant. The reservation management device includes: at least one processor; and at least one memory storing computer program code. The computer program code, when executed by the at least one processor, causes the at least one processor to execute: a sharing establishment step of establishing a sharing state in a communication tool where information is output from a plurality of accounts and shared on a chat screen, wherein information is shared on the chat screen between the customer terminal and an account of the reservation management device in the sharing state; a designation request step of sequentially outputting, with the reservation management device, a plurality of pieces of designation request information on the chat screen, the plurality of pieces of designation request information requesting the customer to specify each of a plurality of reservation contents for at least a reservation date and time, a number of people, and a reserved item; a designation result acquisition step of acquiring a designation result of each of a plurality of reservation contents received by a customer terminal used by the customer on the chat screen each time each of the plurality of pieces of designation request information is displayed on the chat screen; and a reservation information storage step of storing, in a storage device, reservation information indicative of the designation result of each of the plurality of reservation contents acquired at the result acquisition step. A plurality of pieces of the reservation information are acquired by sequentially executing the designation request step and the designation result acquisition step on each of the plurality of reservation contents.

In an eighth aspect of the present disclosure, a non-transitory, computer readable storage medium stores a reservation management program executed in a reservation management device that manages reservations of a restaurant. The reservation management program, when executed by a control unit of the reservation management device, causes the control unit to execute: a sharing establishment step of establishing a sharing state in a communication tool where information is output from a plurality of accounts and shared on a chat screen, wherein information is shared on the chat screen between the customer terminal and an account of the reservation management device in the sharing state; a designation request step of sequentially outputting, with the reservation management device, a plurality of pieces of designation request information on the chat screen, the plurality of pieces of designation request information requesting the customer to specify each of a plurality of reservation contents for at least a reservation date and time, a number of people, and a reserved item; a designation result acquisition step of acquiring a designation result of the plurality of reservation contents received by a customer terminal used by the customer on the chat screen when the plurality of pieces of designation request information are displayed on the chat screen; and a reservation information storage step of storing, in a storage device, reservation information indicative of the designation result of the plurality of reservation contents acquired at the result acquisition step. A plurality of pieces of the reservation information are acquired by sequentially executing the designation request step and the designation result acquisition step on each of the plurality of reservation contents.

In a ninth aspect of the present disclosure, a restaurant management system that manages a restaurant. The restaurant management system includes: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event in response to a request by a customer. The event execution device includes a display device that is configured to display a particular image. The event control unit is configured to execute an event start step of controlling the display device that is conveyed on the conveying path to display the particular image, as the event, on the conveying path when the event execution device reaches a seat for which the event is to be performed.

In a tenth aspect of the present disclosure, a restaurant management method is executed by a restaurant management system that manages a restaurant. The restaurant management system includes: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event in response to a request by a customer. The event execution device includes a display device that is configured to display a particular image. The restaurant management method includes executing, with the event control unit, an event start step of controlling the display device that is conveyed on the conveying path to display the particular image, as the event, on the conveying path when the event execution device reaches a seat for which the event is to be performed.

In an eleventh aspect of the present disclosure, a non-transitory, computer readable, storage medium stores a restaurant management program for a restaurant management system that manages a restaurant. The restaurant management system includes: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event in response to a request by a customer, wherein the event execution device includes a display device that is configured to display a particular image. The restaurant management program, when executed by at least one processor of the restaurant management system, causes the at least one processor to perform an event start step, with the event control unit, of controlling the display device that is conveyed on the conveying path to display the particular image, as the event, on the conveying path when the event execution device reaches a seat for which the event is to be performed.

According to the restaurant management system, restaurant management method, reservation management device, and the storage medium storing the reservation management program in the present disclosure, a restaurant can be appropriately operated.

BRIEF DESCRIPTION OF DRAWING

FIG. 13 is a diagram showing one example of a list of reservation information on a particular reservation date output by a restaurant terminal.

FIG. 15 is a diagram showing one example of customer visit information output by the restaurant terminal.

DETAILED DESCRIPTION OF EMBODIMENTS

<Overview>

Figure 1:
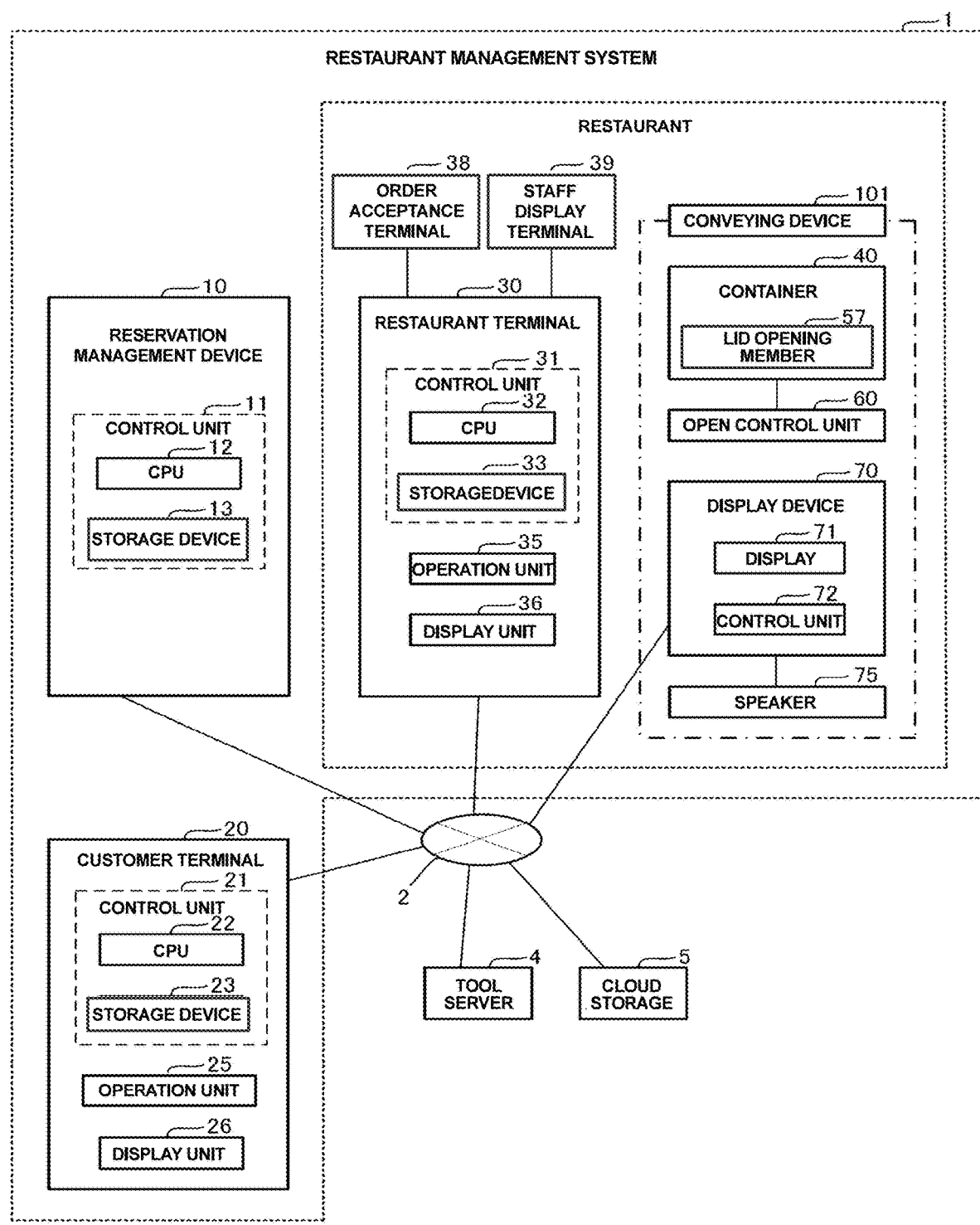
FIG. 1 is a block diagram showing a schematic configuration of a restaurant management system according to a present embodiment.

A first aspect of a restaurant management system in the present disclosure includes a customer terminal used by a customer and a reservation management device for managing reservations of restaurants. The customer terminal and the reservation management device are connected to a network. The restaurant management method and restaurant management program in the present disclosure are executed by at least one of a plurality of devices of the restaurant management system.

The first aspect of the restaurant management system in the present disclosure executes a sharing establishment step and a designation acceptance step. At the sharing establishment step, in a communication tool where information is output from a plurality of accounts and is shared on a chat screen, a customer terminal establishes a state in which information can be shared on the chat screen with an account of the reservation management device. The sharing establishment step is performed based on an operation instruction by the customer who wishes to make a reservation. The reservation management device sequentially outputs, on the chat screen, a plurality of pieces of designation request information. The plurality of pieces of designation request information requesting the customer to specify each of a plurality of reservation contents for at least a reservation date and time, a number of people, and a reserved item. At a designation acceptance step, the customer terminal receives designations by the customer on the chat screen when the plurality of designation request information are sequentially output on the chat screen in order by the reservation management device. A plurality of reservation information indicative of the reservation contents received at the designation acceptance step are acquired by sequentially executing the designation acceptance step for each of the plurality of reservation contents. The reservation management device executes a reservation information storage step of acquiring reservation information indicative of the plurality of reservation contents received at the designation acceptance step and of storing the reservation information in a storage device.

According to the first aspect, the customer can easily and appropriately specify reservation contents by simply specifying the reservation contents requested by the designation request information step by step through the chat screen each time the designation request information is displayed on the chat screen. In other words, multiple pieces of the reservation information are properly acquired through chat conversation between the customer and the restaurant side on the chat screen. Therefore, multiple pieces of information necessary for operating a restaurant (making a reservation) can be acquired from a customer through a clear, simple procedure.

It should be noted that in the present disclosure, reservation contents are acquired in the order of a reserved item, a reservation date and time, and the number of people under the reservation. However, the order in which the reservation contents are acquired may be changed accordingly. In addition to the reservation date and time, the number of reserving people, and the reserved item, other types of reservation contents may be acquired at the designation reception step. For example, when a customer comes to the restaurant, the reservation management device may output, on the chat screen, designation request information requesting the customer to specify the timing of providing the reserved item (for example, specify a time period from the time of visiting the restaurant and the time of providing the reserved item). In this case, it will be easier for the restaurant to provide a customer with a reserved item appropriately at a predetermined timing. In addition, the designation request information may include information requesting the customer to specify whether a table or counter is desired.

Various devices capable of processing various kinds of information may be used as the reservation management device. For example, a server may be used as the reservation management device. In this case, the server may be a server (so-called a cloud server) of a vendor that provides cloud services, or a server other than a cloud server (for example, a server owned by a restaurant). A device other than a server (for example, a personal computer (hereinafter, simply referred to as a "PC") or the like) may be used as the reservation management device. In addition, the reservation management device may be formed of a single device or a plurality of devices. For example, a server and a database may serve as the reservation management device, or a plurality of information processing devices (servers and PCs, etc.) may serve as the reservation management device. The reservation management device (e.g., a server, etc.) may be located in a different country than the country where the reservation management service is provided.

Apart from the restaurant management system, there may be a tool server to operate the communication tool. In this case, each of the customer terminal and the reservation management device may be connected to the tool server through a network to output information on the chat screen of the communication tool and display the information on a display area in the chat screen, etc.

The designation request information output on the chat screen by the reservation management device includes a plurality of selection candidates for the reservation date and time, the number of people, and the reserved item. At the designation acceptance step, the customer terminal may accept the reservation date and time, the number of reserving people, and the reserved item by the customer by accepting an instruction of accepting at least one of the plurality of selection candidates displayed on the chat screen.

In this case, the customer can specify the reservation date and time, the number of reserving people, and the reserved item by simply selecting the desired selection candidate among from the plurality of selection candidates displayed on the chat screen. Accordingly, a customer can input information necessary to make a reservation without having to enter text. Therefore, multiple pieces of information necessary for making a reservation for a restaurant are acquired through a simple procedure. However, at least one of the reservation date and time, the number of reserving people, and the reserved item may be specified by inputting characters (text) into the customer terminal. Even in this case, the multiple pieces of information required for making a reservation are properly acquired through an interactive process.

In some cases, a certain number of days (hereinafter, referred to as "preparation days") are required to prepare a reserved item at a restaurant. In this case, the reservation management device may limit the selection candidates for the reservation date displayed on the chat screen to dates later than the date after the number of preparation days from the date on which the customer made the reservation. In this case, regardless of which candidate for the reservation date and time displayed on the chat screen is selected by the customer, the reserved item is well prepared at the restaurant. Therefore, it will be easier to acquire the information necessary for making a reservation for the restaurant.

The reservation management device or the customer terminal may further execute a reservation content output step of outputting reservation contents corresponding to the selected candidates on the chat screen when an instruction of selecting at least one of the plurality of selection candidates is accepted in the designation acceptance step.

In this case, the customer can confirm whether the reservation contents have been correctly selected by checking the reservation contents that are displayed each time the desired selection candidate is selected. Then, the customer can proceed to the next step. Therefore, it is easier to accurately acquire multiple pieces of information required for making a reservation through a simple procedure.

The reservation management device may execute a candidate switching process of switching the plurality of selection candidates for at least one of the reservation date and time, the number of people, and the reserved item to other selection candidates on the chat screen in response to the customer operating an operation unit.

In this case, the customer can display other multiple selection candidates on the chat screen by operating the operation unit once even if the desired selection candidate is not included in the plurality of selection candidates that are currently displayed on the chat screen. Therefore, even if the number of the selection candidates that can be displayed on the chat screen at one time is limited, the customer can find a desired selection candidate by simply moving pages on the chat screen.

The restaurant management system may further execute an upload request step and an image data transmission step. At the upload request step, the reservation management device outputs, on the chat screen, the upload request information requesting the customer to upload image data to be presented to the customer in a restaurant. At the image data transmission step, the customer terminal transmits the image data designated by the customer to the reservation management device.

In this case, in addition to the information of the reservation date and time, the number of people, and the reserved item, the image data to be provided in the restaurant is also acquired by the reservation management device through the chat screen. Therefore, multiple items of information necessary for running a restaurant can be acquired from a customer through a clear, simple procedure.

Note that the image data acquired at the upload request step and the image data transmission step may be video data or still image data. Further, when the customer visits a restaurant, the image may be presented to the customer by being displayed on a display unit, or the image may be presented to the customer by being printed out by a printing device.

The reservation management device may store the image data transmitted from the customer terminal at the image data transmission step in a cloud storage (database on the cloud). In this case, the restaurant terminal disposed in the restaurant can provide the image to the customer at the restaurant by acquiring the image data from the cloud storage via the network even if the image data is not transmitted from the reservation management device.

At the upload request step, the reservation management device may include information explaining the procedure for uploading the image data using the customer terminal (upload procedure explanation information) in the upload request information. In this case, the customer can upload the image data easily and appropriately by following the procedure indicated by the upload procedure description information displayed on the chat screen. Therefore, it is easier for customers to upload image data accurately with a simple procedure.

At the upload request step, the reservation management device may include, in the upload request information, information explaining the conditions of the data of uploadable images (for example, if the image is a video image, the maximum time duration of the video image, and at least one of the orientation (vertical or horizontal) of the video image). Accordingly, customers can upload the image data that matches the conditions by checking the conditions displayed on the chat screen.

However, the customer terminal may accept an instruction as to whether to upload an image from the customer through the chat screen. The customer terminal may skip the image data transmission step when an instruction for not uploading an image is input. In this way, the appropriate information and data according to the customer's request are acquired by the reservation management device. It is also possible to skip the upload request step and the image data transmission step.

The restaurant management system may include a conveying path, a display device, and a display control unit in a restaurant. The conveying path extends along seats for customers, and a variety of items are conveyed. The display device is conveyed on the conveying path and can display an image transmitted to the reservation management device at the image data transmission step. The display control unit controls the display device to display the image. A seat is assigned to the customer who made a reservation when the customer comes to the restaurant. Seat information indicative of the seat assigned to the customer is associated with the reservation information acquired at the designation acceptance step. The display control unit may execute, based on the seat information, a display start step of starting displaying the image uploaded by the customer when the display device conveyed on the conveying path reaches the seat assigned to the customer.

Accordingly, when the customer specifies the reservation contents and uploads image data using the customer terminal, the display device starts displaying the uploaded image when the display device conveyed on the conveying path reaches the customer's seat. According to the present disclosure, in addition to ensuring that a restaurant for a reservation is properly made, an event such as celebrations is performed at an appropriate timing for a customer who comes to the restaurant at the reserved date and time. Therefore, the customers who visit the restaurant can be fully entertained.

It should be noted that the display device may be conveyed on conveying path together with a container, as will be described later. The timing at which the images are displayed by the display device and the timing at which the lid of the container is opened may be set such that the two timings have a predetermined time difference or less. Accordingly, the timing of displaying the image and the timing of opening the lid of the container are appropriately set such that the customers in the restaurant can be further entertained.

As a device for displaying an image, a mobile terminal such as a smartphone or a tablet terminal may be used. The display device for displaying the image may be a display of the mobile terminal. The display control unit may be a controller of the portable terminal. In this case, the image is displayed at an appropriate timing using the mobile terminal. In addition, when the controller of the portable terminal is used as the display control unit, the portable terminal may have a dedicated application for controlling the display timing of the image, etc. In this case, a dedicated application can control a timing of displaying the image.

The restaurant management system may have a speaker and an audio control unit at the restaurant store. The speaker is carried by the conveying path and can play audio data. The audio control unit controls the speaker to play audio data. The audio control unit may execute, based on the seat information, an audio start step of starting playing the audio data when the speaker conveyed on the conveying path reaches the seat assigned to the customer. In this case, the audio data is played when the speaker reaches the customer's seat by the conveying path. Therefore, the customers in the restaurant can be fully entertained.

It should be noted that the speaker may be conveyed on the conveying path together with the display device. The timing at which the images are displayed by the display device and the timing at which the speaker plays the audio data may be set such that the two timings have a predetermined time difference or less. Therefore, the customers in a restaurant can be fully entertained. In addition, the audio control unit and the display control unit may be the same controller (for example, the controller of the portable terminal described above) or may be separate controllers.

The configuration of the conveying path may be changed accordingly. For example, the conveying path may be a circulation conveying path that circulates items in a predetermined direction along a plurality of seats in a restaurant. Further, the conveying path may be a direct conveying path that directly conveys an item to the seat of the customer who placed an order for the item.

The display control unit may set, at the display start step a timer with a time necessary for the display device conveyed on the conveying path to reach the seat indicated by the seat information, and control the display device to start displaying the image when the timer counts up the set time. In this case, the image is properly displayed at a timing at which the display device reaches the seat assigned to the customer, even without a sensor or the like to detect that the display device reaches the seat. Thus, events are executed appropriately with a simple configuration.

However, it is also possible to change the method for starting displaying the image. For example, the restaurant management system may include sensors that detect that the display device reaches respective seats. The display control unit may start displaying the image at a timing at which the sensor detects that the display device reaches the seat indicated by the seat information.

A plurality of accounts of the reservation management device may be created for a plurality of restaurants. Information is sharable between each of the plurality of accounts of the reservation management device and the customer terminal at the sharing establishment step. Data for outputting the designation request information on the chat screen may be stored in database for each of the plurality of restaurants. In this case, it is also possible to change the designation request information displayed on the chat screen for each restaurant. Accordingly, multiple pieces of information necessary for operating the restaurants can be appropriately acquired according to the respective restaurants.

The method for establishing a state where information is able to be shared between the reservation account for each restaurant and the customer terminal may be changed accordingly. For example, in the communication tool as described above, an information providing account may be created for each restaurant to provide various information to the customer terminal. A link (such as a banner) is put on the chat screen created by the information providing account for each restaurant to access the reservation account for the restaurant. In this case, the customer can easily access the reservation account through the account for providing information for the desired restaurant. In addition, a link may be put on the restaurant website to access each of the reservation accounts each created for the respective restaurant. In this case, the customer can easily access the reservation account for the desired restaurant simply by selecting the desired link.

The reservation management device may execute an inquiry acceptance step of accepting inquiry text from the customer through the chat screen after the designation acceptance step for the plurality of reservation contents was completed. In this case, the customer can enter text of an inquiry to the restaurant using the same chat screen that was used to specify multiple reservation information. Therefore, the customer can easily make an inquiry to a restaurant even after the reservation information has been specified.

The reservation management device may execute an automatic response step of automatically outputting a response to the inquiry text on the chat screen based on the inquiry text accepted at the inquiry reception step. In this case, when the customer enters text of an inquiry on the chat screen, the answer to the inquiry is automatically output to the chat screen. Thus, the customer will be able to quickly and accurately understand the answers to their inquiries.

It should be noted that the method for automatically outputting responses to inquiry texts may be changed accordingly. For example, a rule may be made in advance for determining responses to inquiry texts based on words and the like in the inquiry texts. At an automatic response process, the reservation management device may automatically determine the response and output the response on the chat screen by analyzing words and the like in the inquiry text and applying the analyzed words and the like to the rule. In this case, the answer to the inquiry is output appropriately on the chat screen without the restaurant staff having to consider and input the answer.

In addition, the reservation management device may automatically output, on the chat screen, an answer output by a mathematical model by inputting the inquiry text accepted at the inquiry reception step into the mathematical model trained by a machine learning algorithm. The mathematical model may be trained in advance to output responses to inquiries by inputting inquiry texts into the mathematical model. For example, the mathematical model may be trained in advance by a machine learning algorithm using inquiry texts as input training data and correct answers to the inquiry texts as output training data. In this case, an answer to query text is automatically output to the chat screen with a higher accuracy.

In addition, the reservation management device may accept an input of a response created by a staff to a text of the inquiry. The reservation management device may output the answer input by the staff on the talk screen. Even in this case, both the customer's inquiry and the response to the inquiry is smoothly processed, using the same chat screen that was used to specify multiple reservation information.

The reservation management device may store the reservation date and time in association with an account of the customer in a storage device. The reservation management device may output re-visit soliciting information to solicit the customer to return to the restaurant on the talk screen of the customer on the date the next year before the predetermined period of the date. The date (the reservation date) reserved by a customer may be the anniversary of the customer's family, etc. Accordingly, the reservation management device stores the reservation date and outputs, on the chat screen, the re-visit soliciting information on the date before the predetermined days of the reservation date in the following year or later, so that the customer can be effectively solicited to visit the restaurant again on the anniversary or the like. In addition, by outputting the re-visit soliciting information on the chat screen for the reservation, the customer can make a reservation directly through the chat screen where the re-visit soliciting information is output. This makes it even more likely that customers will come back.

Note that the method for using the reservation information acquired by the system may be changed accordingly. For example, the reservation management device may send a celebration message or the like to the customer by various methods (e.g., outputting information to the chat screen or transmitting information by another transmitting tool) after acquiring an approval from the customer to use the reservation information. In addition, the reservation management device may display a questionnaire on the chat screen after the customer visits the restaurant on the reservation date.

The restaurant management system may also have a store terminal in a restaurant. The restaurant terminal manages the status of customers who come to the restaurant. The store terminal may execute a reservation information acquisition step and a customer visit information output step. At the reservation information acquisition step, the store terminal acquires the reservation information acquired by the designation acceptance step. At the visit information output step, the store terminal associates the seat information indicating the seat assigned to the customer with the reservation information of the customer when the customer who made the reservation indicated by the reservation information comes to the restaurant. The restaurant terminal outputs the customer visit information including the seat information and the reserved item information included in the reservation information.

By checking the customer visit information outputted by the restaurant terminal, the staff of the restaurant can appropriately recognize the seat information of the customer who made the reservation and came to the restaurant and the information of the reserved item which was requested in advance. Accordingly, the reserved item can be properly provided to the seat of the customer who made the reservation.

The method for the restaurant terminal to output customer visit information may be changed accordingly. For example, the restaurant terminal may output the customer visit information by controlling the staff display device to display the customer visit information that can be confirmed by staffs. In addition, the restaurant terminal may output the customer visit information by controlling a printer to print out the customer visit information.

The restaurant terminal sequentially updates vacant seat information indicating the availability of the plurality of seats in the restaurant. The store terminal may execute the seat assigning step of automatically assigning an empty seat to the customer based on the vacant seat information and the number of customers (may be the number of people who have made a reservation) when the customers (including the customer who has made a reservation) come to the restaurant. In this case, an empty seat will be automatically and appropriately assigned to the customer, making it easier to run the restaurant.

In addition, the restaurant terminal may output a list of reservation information for a particular day (e.g., today or the next day, etc.) at its own restaurant. Therefore, staffs of the restaurant can work by checking the list to know the number of reservation information, the reservation time, the reserved items, etc. on a specific day. Accordingly, the restaurant can operate smoothly. It should be noted that the method for outputting the list of reservation information may be, as mentioned above, a method for displaying the list on the staff display device or a method for printing the list by a printing device.

The restaurant terminal may determine a time of providing the reserved item to the customer according to a visit time of the customer who made the reservation indicated by the reservation information and a type of the reserved item indicated by the reservation information. The restaurant terminal may include information indicating the determined providing time in the customer visit information.

Depending on the type of the reserved item, the preferred timing of providing the reserved item to the customer is often different. For example, if the reserved item is a dessert, it is desirable to serve it at a later timing as compared to a food or drink other than the dessert as the reserved item. Accordingly, the time of providing the reserved item is determined according to the type of the reserved item so that the reserved item can be provided to the customer at an appropriate timing according to the type of the reserved item.

However, it is also possible to change the method for notifying staffs of the timing of providing the reserved item may be changed. For example, the restaurant management system may provide each restaurant with an order acceptance terminal that accepts orders for a food or a beverage from customers. The order acceptance terminal may accept an instruction by a customer to specify a providing timing to provide the reservation present. The order acceptance terminal may notify a staff of the providing timing. In this case, the customer who reserved the reserved item may receive the reserved item at an appropriate timing by operating the order acceptance terminal.

The restaurant management system may include a conveying path, a container, a lid opening member, and a display control unit. As described above, the conveying path extends along seats for customers, and a variety of items are conveyed. The container is conveyed by the conveying path. The container has a lid that can be opened and closed to house an item. The lid opening member opens the lid of the container. The open control unit controls the lid opening member. The open control unit may execute a lid opening step of opening the lid of the container by the lid opening member at a timing at which the container conveyed by the conveying path reaches the seat assigned to the customer based on the seat information.

In this case, the lid of the container is automatically opened when the container reaches the customer's seat by the conveying path. According to the present disclosure, in addition to ensuring that a restaurant for a reservation is properly made, an event such as celebrations is performed at an appropriate timing for a customer who comes to the restaurant at the reserved date and time. Therefore, the customers who visit the restaurant can be fully entertained.

Note that when the control to open the lid at a predetermined timing and the control to start displaying the image at a predetermined timing are executed together, the open control unit and the display control unit may be the same processor or different processors. Similarly, when the control to open the lid at a predetermined timing and the control to start playing audio data at a predetermined timing are executed together, the open control unit and the audio control unit may be the same processor or different processors.

The open control unit may set, at the lid opening step, a timer with a time necessary for the container conveyed on the conveying path to reach the seat indicated by the seat information, and control the lid opening member to open the lid when the timer counts up the set time. In this case, the lid of the container is properly opened when the container reaches the seat assigned to the customer without a sensor or the like to detect that the container reaches the seat. Thus, events are executed appropriately with a simple configuration.

In the present disclosure, the lid opening member is disposed in the container. However, the lid opening members may be provided at a plurality of positions along the conveying path on which the container is conveyed. In this case, the open control unit may control the lid open unit to open the lid when a sensor or the like detects that the container reaches the seat indicated by the seat information (i.e., at a timing at which the container reaches the seat).

The container may store the reserved item indicated by the reservation information associated with the seat information. In this case, in addition to the reservation for the restaurant including the designation of the reserved item being appropriately made, when the customer visits the restaurant on the reserved date and time, the reserved item that was selected in advance is conveyed to the customer's seat on the conveying path while the reserved item is housed in the container. Furthermore, when the container reaches the customer's seat by the conveying path, the lid of the container is automatically opened and the reserved item housed in the container is disclosed to the outside. Therefore, a celebration or another event is performed appropriately, so that the customers in the restaurant can be fully entertained. However, the event can be performed even if an item other than the reserved item is housed in the container.

The second aspect of the restaurant management system in the present disclosure includes a conveying path, an event execution device, and an event control unit. The conveying path extends along seats for customers in the restaurant and is configured to convey an item. The event execution device is conveyed on the conveying path in the restaurant and performs an event on the conveying path. The event control unit controls the event execution device to perform the event. The restaurant management method and restaurant management program in the present disclosure are executed by at least one of a plurality of devices of the restaurant management system.

The seat is assigned to a customer who made a reservation when the customer comes to the restaurant. Seat information indicative of the seat assigned to the customer is associated with reservation information indicative of a plurality of reservation contents for at least a reservation date and time and a number of people. The reservation information is acquired in response to the customer inputting an instruction into a customer terminal used by the customer. The event control unit executes an event start step of controlling the event execution device conveyed on the conveying path to start the event on the conveying path when the event execution device reaches the seat assigned to the customer based on the seat information.

According to the second aspect, the customer makes a reservation using the customer terminal and when the customer comes to the restaurant on the reserved date and time, the event execution device starts an event on the conveying path by the event execution device at a timing at which the event execution device reaches the customer's seat by the conveying path. Accordingly, in addition to ensuring that a restaurant reservation is properly made, an event such as celebrations are performed at an appropriate timing for a customer who comes to the restaurant at the reserved date and time. Therefore, the customers who visit the restaurant can be fully entertained.

It should be noted that the restaurant management system according to the second aspect may acquire reservation information by the method exemplified in the first aspect (i.e., the method for acquiring the reservation information interactively using a communication tool) or may acquire the reservation information in other ways. For example, the reservation management device in the second aspect may acquire the reservation information in various ways, such as using a dedicated web site, using a dedicated application, and using e-mail, and then stores the reservation information in the storage device. It is also possible to realize the restaurant management system in the second aspect without using the reservation information. In other words, in the second aspect, it is also possible to eliminate the configuration of "associating seat information indicative of a seat assigned to the customer who made a reservation and visits the restaurant with the reservation information indicative of reservation contents of at least reservation date and time and the number of reserving people, the reservation information being acquired according to an instruction input into a customer terminal used by the customer".

In addition, the event execution device in the second aspect may be at least one of the display device, the container, and the speaker described in the first aspect. In addition, the event control unit in the second aspect may be at least one of the display control unit, the open/close control unit, and the audio control unit exemplified in the first aspect. However, it is also possible to use, as the event execution device, a configuration different from the display device, the container, and the speaker exemplified in the first aspect (for example, at least one of a robot that starts operating based on a driving instruction and a light source that starts emitting light based on a lighting instruction).

At least one of the plurality of components of the restaurant management system in the first aspect and the plurality of processes (steps) executed by the restaurant management system in the first aspect may also be used in the restaurant management system in the second aspect.

The third aspect of the restaurant management system in the present disclosure includes a conveying path, an event execution device, and an event control unit. The conveying path may extend along seats for customers in the restaurant and may be configured to convey an item. The event execution device may be conveyed on the conveying path in the restaurant and performs an event on the conveying path. The event control unit controls the event execution device to perform the event. The event control unit executes an event start step of controlling the event execution device conveyed by the conveying path to start the event on the conveying path when the event execution device reaches a seat for which the event is to be performed.

According to the third aspect, the restaurant management system can also execute the event exemplified in the first and second aspects at a restaurant without using the reservation information. In other words, according to the third aspect, an event is performed on the conveying path by the event execution device when the event execution device reaches the seat of the target customer by the conveying path, regardless of whether the customer made a reservation in advance. Therefore, an event such as a celebration may be carried out at an appropriate timing, making it possible to fully entertain customers in the restaurant.

The event execution device in the third aspect may be at least one of the display device, the container, and the speaker described in the first and second aspects. In addition, the event control unit in the third aspect may be at least one of the display control unit, the open/close control unit, and the audio control unit exemplified in the first and second aspects. Note that when the image is displayed on the display device, the image is not necessarily limited to the one uploaded or selected by the customer. For example, the display device may display an image that is prepared by the restaurant side in advance.

When the display device is used as the event execution device, the display control unit may start displaying the image for the event at a timing at which the display device reaches the seat for which the event will be performed. The event image is an image that is displayed during the event. The contents of the event image may be changed accordingly. Note that an image different from the event image may be displayed before and/or after displaying the event image. In other words, regardless of which seat the event will be performed, the event appropriately gets excited even when another image is displayed before and after the event image is displayed by aligning the timing at which the display device reaches the seat for which the event is scheduled to be performed with the timing at which a specific event image is displayed. For example, before displaying the event image, a table notification image or the like that notifies a customer of the table for which the event will be performed may be displayed. In addition, after displaying the event image, a table notification image indicating that an item for the table for which the event was performed was conveyed may be displayed.

When the event device in the third aspect includes both the display device and the container, the event image displayed by the display device controlled by the event control unit at the time of the event may be an image associated with opening of the lid of the container. In this case, the event of opening the lid of the container gets further livened up by the image displayed on the display device.

For example, the event image associated with opening of the lid of the container may include an attention guiding image that prompts the customer to pay attention to the container before the lid is opened. In this case, customer's attention can be paid to the container before the lid is opened, which appropriately avoids a situation where the customer overlooks the event.

In addition, the event image associated with opening of the lid of the container may include a take-out guiding image that prompts the customer to take the item housed in the container after the lid is opened. In this case, it is possible to avoid a situation where the item placed in the container moves to the table of another customer without being taken by the customer.

In addition, the event image associated with opening the lid of the container may include a celebration image celebrating the customer with a celebration gift provided by the container to the customer. In this case, the celebration image further enlivens the event during which the lid is opened.

At least one of the plurality of components of the restaurant management system in the first and second aspects and the plurality of processes (steps) executed by the restaurant management system in the first and second aspects may also be used in the restaurant management system in the third aspect.

It is also possible to change the above-mentioned first to third aspects. For example, in the restaurant management system of the above-described second aspect and the third aspect, the event execution device capable of executing the event on the conveying path starts the event on the conveying path by the event execution device at the timing the event execution device reaches the seat of the customer by the conveying path. However, the restaurant management system may control the timing of displaying the image by the display device (which may also serve as an order acceptance device) disposed at the customer's seat. For example, the restaurant management system may start displaying an image by the display device disposed at the seat of the customer who placed the order at the time at which an item ordered by the customer reaches the seat of the customer on the conveying path. The image to be displayed on the display device may be an image uploaded from the customer terminal used by the customer who placed an order for the item, or an image selected by the customer who placed the order for the item among from a plurality of images. In this case, the event with the image selected by the customer starts at the appropriate timing at which the item ordered by the customer reaches the customer's seat. Therefore, the customers who visit the restaurant can be fully entertained. In addition, the image to be displayed on the display device may be an image prepared in advance by the restaurant side.

It should be noted that the restaurant management system in the present aspect may also be appropriately combined with at least a portion of the configuration and control of the restaurant management system in the first to third aspects described above. The restaurant management system in this aspect can also be expressed as follows.

A restaurant management system is configured to manage a restaurant. The restaurant includes a conveying path that extends along seats for customers and is configured to convey an item, a display device that is disposed in a set for a customer and is configured to display an image, and a display control unit that is configured to control the display device to display the image. A seat is assigned to a customer when the customer comes to the restaurant. The display control unit is configured to execute, based on seat information indicative of the seat assigned to the customer, a display start step of controlling the display device to display, at a timing at which an item ordered by the customer reaches the seat assigned to the customer, an image acquired from a customer terminal used by the customer, an image selected by the customer among a plurality of images, or an image that is prepared in advance by the restaurant.

Embodiment (System Configuration)

Hereinafter, one of the exemplary embodiments in the present disclosure will be described with reference to the drawings. First, referring to FIG. 1, one example of the system configuration of a restaurant management system 1 according to the present embodiment will be described schematically. The restaurant management system 1 in the present embodiment receives reservations from customers and manages reservation information. The restaurant management system 1 further manages events based on the reservation information when each of customers who made a reservation comes to a restaurant. The restaurant management system 1 of the present embodiment includes a reservation management device 10 and a customer terminal 20.

The reservation management device 10 manages a reservation for a restaurant (in this embodiment, one restaurant among a plurality of restaurants) by a customer by processing various information. As an example, a server is used as the reservation management device 10 in the present embodiment. In detail, in the present embodiment, a server (so-called a cloud server) of a vendor providing a cloud service is used as the reservation management device 10. However, a server other than a cloud server may be used as the reservation management device 10. A device other than a server (for example, a personal computer (hereinafter, simply referred to as a "PC") or the like) may be used as the reservation management device 10. In addition, the reservation management device 10 may be formed of a single device or a plurality of devices. For example, a server and a database may serve as the reservation management device 10, or a plurality of information processing devices (servers and PCs, etc.) may serve as the reservation management device 10. The reservation management device 10 may be located in a country different from a country where the reservation service is provided (the country where the reserved restaurant is located).

The reservation management device 10 is provided with a control unit 11 for performing various processing controls and a communication I/F (not shown). The control unit 11 includes a CPU 12 that is a controller and a storage device 13 that stores programs, data, and the like. The storage device 13 may store at least a part of a reservation management program and a restaurant management program for executing a reservation management process (see FIG. 5), a post-reservation inquiry process (see FIG. 12), a customer reception process (see FIG. 14), and an event control process (see FIG. 17), as will be described later. In addition, the storage device 13 in the present embodiment may serve as a database server for managing (storing) the reservation information. However, the reservation information may be stored in a cloud storage (database on a cloud) 5. The communication I/F connects the reservation management device 10 to an external device (e.g., a restaurant terminal 30, a tool server 4, and the cloud storage 5, etc.) via a network 2 (e.g., the Internet).

The customer terminals 20 are used by customers (users) who are using the reservation service for a restaurant provided by the reservation management device 10. The reservation service provided by the reservation management device 10 may be used in a plurality of customer terminals 20. In FIG. 1, only one customer terminal 20 is illustrated for simplicity of explanation. The customer terminal 20 exemplified in the present embodiment is a smartphone carried by a customer. However, a portable terminal other than a smartphone (e.g., a tablet terminal) may be used as the customer terminal 20. In addition, a PC (e.g., a notebook PC, etc.) may be used as the customer terminal 20.

The customer terminal 20 includes a control unit 21 that performs various control processing and a communication I/F (not shown). The control unit 21 includes a CPU 22 that is a controller and a storage device 23 that stores programs, data, and the like. The storage device 23 may store at least a part of the restaurant management program for executing the reservation management process (see FIG. 5) as described later and the post-reservation inquiry process (see FIG. 12). The communication I/F connects the customer terminal 20 to an external device (e.g., the tool server 4, etc.) via the network 2. The customer terminal 20 also includes an operation unit 25 and a display unit 26. The operation unit 25 is operated by the user (the customer) to input various instructions into the customer terminal 20. At least one of a touch panel, various buttons, a keyboard, a mouse, etc. may be used as the operation unit 25. In addition, a microphone or the like for inputting various instructions may be used together with the operation unit 25 or in place of the operation unit 25. The display unit 26 displays various images. Instead of the operation unit 25 and the display unit 26 included in the customer terminal 20, an operation unit and a display unit which are externally connected to the customer terminal 20 may be used.

An application for a communication tool that is designed for outputting and sharing information (messages and images, etc.) on a chat screen from multiple accounts is installed in each of the customer terminals 20. As will be described in detail later, the reservation management device 10 in the present embodiment accepts and manages reservations for restaurants by customers after communicating with the customers interactively using the communication tool. As an example, in the present embodiment, LINE (registered trademark), which is one of the social networking sites (SNS), is used as the communication tool. By connecting, via the network 2, the reservation management device 10 and the customer terminal 20 to the tool server 4 for operating the communication tool, information can be outputted onto the chat screen of the communication tool and displayed on a display area of the chat screen. However, communication tools other than LINE (registered trademark) may be used for the reservation service. For example, a dedicated communication tool (such as a dedicatedly-created application or a dedicatedly-created website) may be used for the reservation service to accept restaurant reservations from customers.

Next, the configuration of the restaurant management system 1 of the present embodiment at each restaurant will be described. The restaurant exemplified in the present embodiment is one of multiple restaurants forming the system 1. The restaurant management system 1 accepts reservations from customers for each of the plurality of restaurants. In addition, the restaurant management system 1 executes an event based on the reservation information at at least one of the plurality of restaurants. In FIG. 1, only one restaurant is illustrated for simplicity of explanation. The restaurant management system 1 in the present embodiment includes a restaurant terminal 30, an order acceptance terminal 38, a staff display device 39, a conveying device 101, a container 40, an open control unit 60, a display device 70, and a speaker 75 at each restaurant.

The restaurant terminal 30 is disposed in the restaurant and manages the status of customers (visitors) who come to the restaurant. The restaurant terminal 30 includes a control unit 31 that performs various control processing and a communication I/F (not shown). The control unit 31 includes a CPU 32 that is a controller and a storage device 33 that stores programs, data, and the like. The storage device 33 may store at least a part of the restaurant management program for executing the customer reception process (see FIG. 14) and the event control process (see FIG. 17), which will be described later. The communication I/F connects the restaurant terminal 30 to an external device (e.g., the reservation management device 10) via the network 2. The restaurant terminal 30 is also connected to the order acceptance terminal 38 and the staff display device 39 via the network 2, a wired communication, or a wireless communication, or the like. The restaurant terminal 30 includes an operation unit 35 and a display unit 36. The operation unit 35 is operated by users (customers, staffs, etc.) to input various instructions into the restaurant terminal 30. At least one of a touch panel, various buttons, a keyboard, a mouse, etc. may be used as the operation unit 35. In addition, a microphone or the like for inputting various instructions may be used together with the operation unit 35 or in place of the operation unit 35. The display unit 36 displays various images.

The order acceptance terminal 38 accepts orders for a food, a beverage, a drink, etc., by customers. In the present embodiment, a touch-panel-type display device is used as the order acceptance terminal 38. A customer can order a desired food or beverage by operating the order acceptance terminal 38. The staff display device 39 includes a display area for displaying various images. The images displayed by the staff display device 39 are checked by staffs at the restaurant. As described above, the order acceptance terminal 38 and the staff display device 39 are connected to the restaurant terminal 30.

The conveying device 101 conveys items (e.g., plates 7 on which a food or a drink is placed (see FIGS. 3 and 4), containers 40, an open control unit 60, a display device 70, and a speaker 75) along a predetermined conveyance route. The container 40 includes a lid 47 that is opened and closed, as will be described in detail later. By closing the lid 47, an item is housed inside the container 40. The container 40 includes a lid opening member 57 that automatically opens the lid 47. The applicant of the present disclosure refers to the container 40 having a function to automatically open the lid 47 as "Super Sendo-Kun (Mr. Super Freshness)". The open control unit 60 controls the lid opening member 57. Details of the conveying device 101 and the container 40 will be described later.

The display device 70 includes a display unit 71 for displaying various images and a control unit (controller) 72 for controlling the display device 70. The control unit 72 serves as a display control unit for controlling the display unit 71 to display images. In the present embodiment, a portable terminal such as a smartphone or a tablet terminal is used as the display device 70. In the display device 70 of the present embodiment, a dedicatedly-created application is installed for controlling a timing of displaying images. However, it is also possible to change the configuration of the display device and the display control unit. For example, the display device for displaying images and the display controller for controlling the display device to display images may be different devices.

The speaker 75 can generate audio sound. In the present embodiment, the speaker 75 is connected to the display device 70 (a mobile terminal in the present embodiment) by wired communication or wireless communication. The control unit 72 of the display device 70 serves as a voice control unit that controls generation of voice sound (reproduction of audio data) by the speaker 75. In the present embodiment, the audio data stored in a storage device of the display device 70 is played by the speaker 75. However, the specific configuration for generating the audio sound may be changed accordingly. For example, an audio control unit for controlling generation of audio sound by the speaker 75 may be provided separately from the control unit 72 of the display device 70. In addition, a speaker in the display device 70, which is a portable terminal, may generate audio sound (play audio data). In this case, the speaker 75 may be omitted.

(Configuration in a Restaurant)

Figure 2:
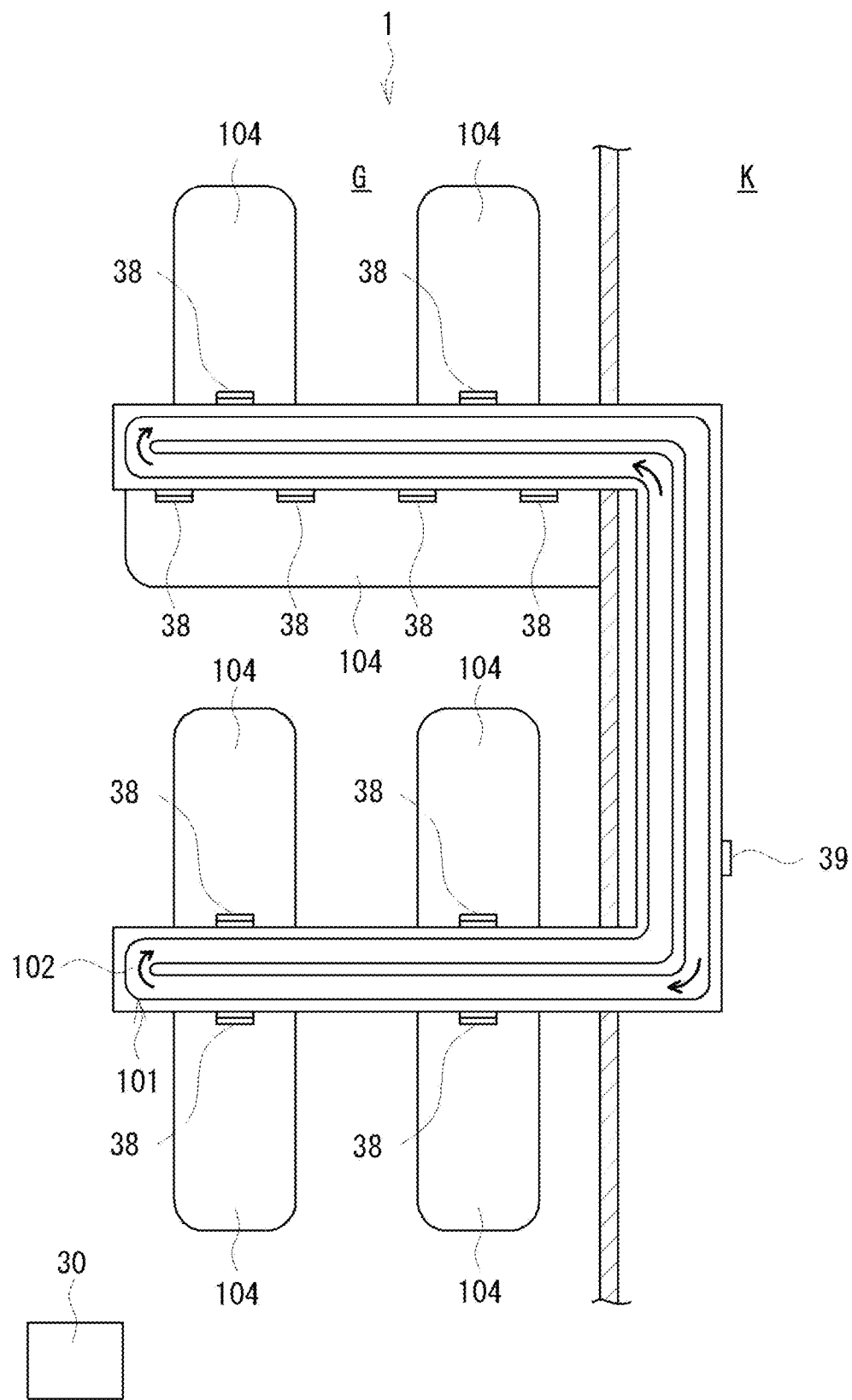
FIG. 2 is a plan view of one example of a configuration in a restaurant where events are managed by the restaurant management system according to the present embodiment.

Referring to FIG. 2, an example of a configuration in a restaurant where events are managed by the restaurant management system 1 of the present embodiment will be described. As shown in FIG. 2, the restaurant management system 1 of the present embodiment includes the conveying device 101 in the restaurant. The conveying device 101 conveys items placed on a conveying path 102 (for example, the plates 7 (see FIGS. 3 and 4) on which a food or a drink is placed, the containers 40, the open control unit 60, the display device 70, and the speaker 75, etc.) in a predetermined conveying direction (the arrow direction in FIG. 2). The conveying path 102 shown in FIG. 2 is a circulation path circulating between a kitchen space K and a dining space G. The items placed on the conveying path 102 in the kitchen space K are sequentially conveyed by the conveying path along a plurality of tables 104 (dining booths) arranged in the dining space G. The item that was not removed from the dining space G is returned to the kitchen space K. For example, a crescent chain or the like that is formed of a plurality of plate pieces may be used. The plate pieces of the crescent chain are moved along the conveying path. One or more seats for customers are arranged adjacent to each table 104. However, the specific configuration of the conveying path 102 may be changed. For example, the conveying path may be a direct conveying path that directly conveys an item to the seat of the customer who placed an order for the item.

The order acceptance terminals 38 described above are disposed at positions near the respective tables 104 and seats in the dining space G. A customer can order a desired food or beverage by operating the order acceptance terminal 38.

In addition, the kitchen space K includes the staff display device 39 described above. The staffs can perform various tasks after checking images displayed on the staff display device 39. For example, the staff checks the contents of the order displayed on the staff display device 39 and sets the ordered items on the conveying path 102. Furthermore, the restaurant terminal 30 described above is disposed in the restaurant. The restaurant terminal 30 manages the status of customers who visit the restaurant.

(Container)

Figure 3:
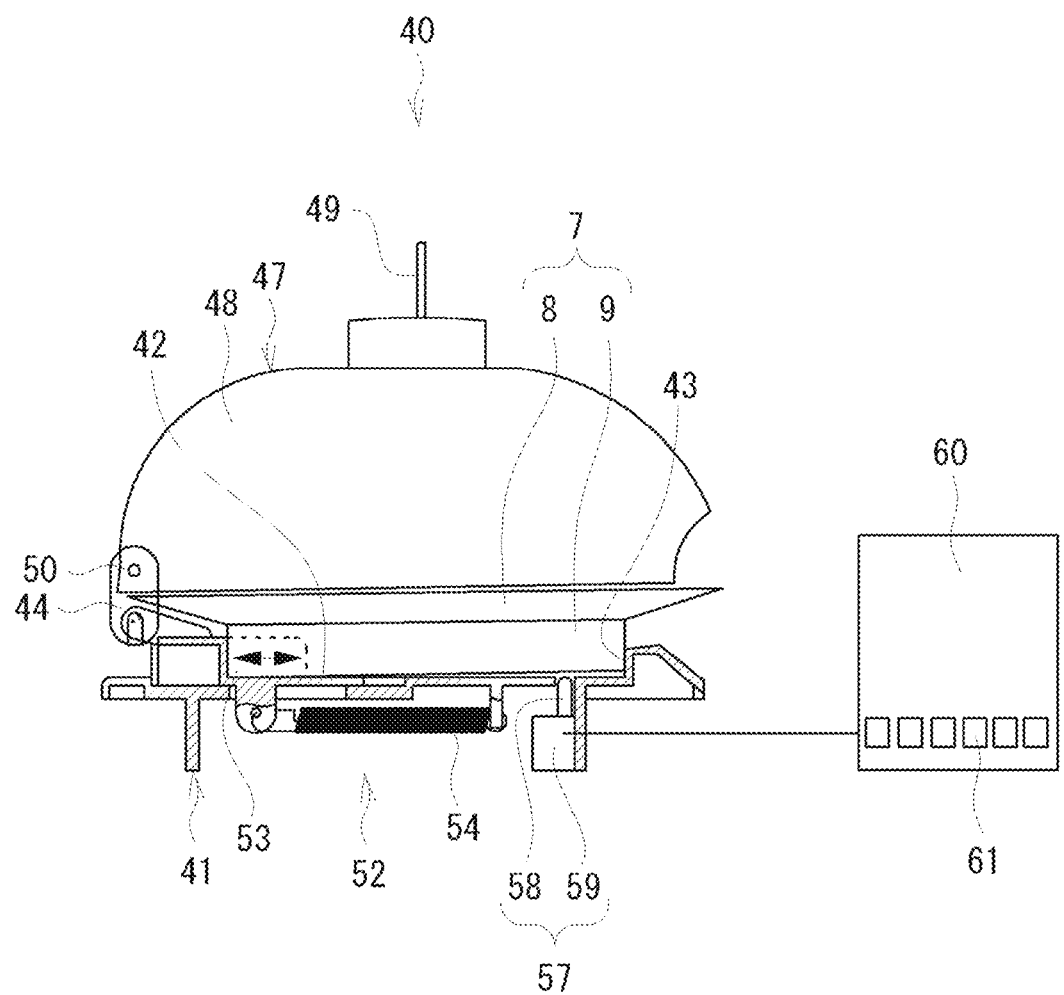
FIG. 3 is a cross-sectional side view of a container with a plate and a lid being closed.
Figure 4:
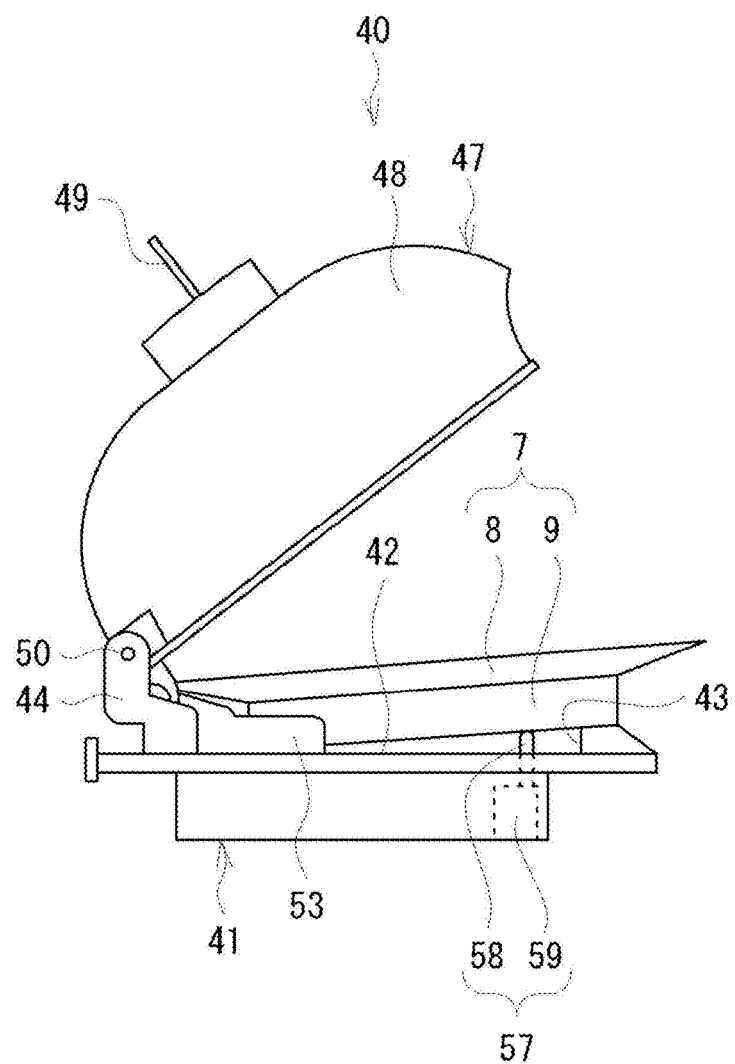
FIG. 4 is a side view of the container with the lid being opened.

The container 40 conveyed by the conveying device 101 (the conveying path 102) in the present embodiment will be described with reference to FIGS. 3 and 4. FIG. 3 is a cross-sectional side view of the container 40 with the plate 7 therein and the lid 47 being closed. FIG. 4 is a side view of the container 40 with the lid 47 being opened. As shown in FIGS. 3 and 4, the container 40 closes the lid 47 and houses the plate 7 therein when the plate 7 with an item such as a food or a drink is placed in the container 40. In addition, the container 40 opens the lid 47 as the plate 7 is removed from the container 40. The plate (a tableware) 7 includes a plate body 8 which is circular-shaped in plan view on which a food or drink is placed, and a cylindrical base 9 which protrudes downward from the plate body 8 at a position slightly inside of an outer circumferential edge of the plate body 8. A circumferential edge of the plate body 8 extends outward from the base 9 to have a flange shape.

As shown in FIG. 3, the container 40 includes a setting holder 41, the lid 47, and an open/close mechanism 52. The setting holder 41 has a plate setting portion 42 at the center of an upper surface of the setting holder 41 on which the plate 7 is set (placed). A stopper 43 is provided on the upper surface of the setting holder 41 in front of the plate setting portion 42 (i.e., on the right side in FIGS. 3 and 4). An outer edge of the lower end of the base 9 of the plate 7 is engageable with the stopper 43. The stopper 43 protrudes upward from the top surface of the plate setting portion 42. The inner circumferential surface of the stopper 43 (i.e., the surface facing in the left side direction in FIGS. 3 and 4) is formed in a curved shape in a plan view to fit the cylindrical shape of the base 9 of the plate 7. A pair of support pieces 44 extending upward are provided on the left and right sides of the rear end portion (i.e., the left end portion in FIGS. 3 and 4) of the setting holder 41. The support pieces 44 support the lid 47 while allowing the lid 47 to open and close.

The lid 47 includes a dome-shaped (i.e., hemispherical) lid body 48 that has an opening on a lower side. In a container for housing a food or a drink, the lid is formed of transparent synthetic resin. Therefore, even when the lid is closed, a customer can see the food or the drink inside the container. On the other hand, the lid 47 of the container 40 used for an event, which will be described later, is formed by a colored synthetic resin that does not allow light to pass therethrough. Accordingly, a customer or the like cannot see an item inside the container 40 (e.g., a present for anniversary, etc.) until the lid 47 is opened. In other words, customers can see the item housed inside only when the lid 47 is opened. Accordingly, the event where the lid 47 is opened can be made more exciting. A pair of arms (not shown) extending downward are provided on the left and right sides of the rear end portion of the lid body 48 (the left end portion in FIGS. 3 and 4). A shaft 50 is disposed in the arms. By attaching the shaft 50 of the arms into a shaft hole formed in the support piece 44 of the setting holder 41, the lid 47 is attached to the setting holder 41 so that the lid 47 can be opened and closed (i.e., rotated in a vertical direction)

about the shaft 50 as a rotational axis. In addition, an identifier 49 (e.g., a QR code (registered trademark), a barcode, etc.) for identifying each container 40 is attached to the upper portion (i.e., the top portion) of the lid 48.

As shown in FIG. 3, the open/close mechanism 52 is provided on the setting holder 41. The open/close mechanism 52 includes an operating portion 53 and a biasing portion 54 (a coil spring in this embodiment). The operating portion 53 is provided to be movable backward and forward along a guide portion formed on the setting holder 41 in a front-rear direction (the left-right direction in FIGS. 3 and 4). One end (the right end in FIG. 3) of the biasing portion 54 is fixed to the setting holder 41, and the other end (the left end in FIG. 3) is fixed to the operating portion 53. As a result, a biasing force in the front direction is applied to the operating portion 53 by the biasing portion 54. The operating portion 53 is connected at a position below the axis of an arm piece (not shown) of the lid 47. When the operating portion 53 moves forward by the biasing force of the biasing portion 54, the arm piece of the lid 47 rotates, and the lid 47 opens. On the other hand, when the operating portion 53 is moved backward against the biasing force of the biasing portion 54, the lid 47 is closed.

When a cooking staff or the like places the plate 7 in the plate setting portion 42 and pushes the plate 7 backward, the operating portion 53 is pushed by the plate 7 to move backward. As a result, the lid 47 is closed. Thereafter, when the plate 7 is completely placed in the plate setting portion 42, the elevated base 9 of the plate 7 is fixed between the stopper 43 of the setting holder 41 and the operating portion 53. Thus, with the food placed on the plate 7 covered by the lid 47 (the lid body 48), the posture of the lid 47 is fixed. On the other hand, when the front side of the plate 7 (the right side in FIGS. 3 and 4) is lifted upward by, e.g., a customer, the engagement between the elevated base 9 of the plate 7 and the stopper 43 is released. As a result, the force of the biasing portion 54 causes the operating portion 53 to push the base 9 of the plate 7 forward, and thus the lid 47 opens.

The container 40 includes a lid opening member 57 that automatically opens the lid 47. As an example, the lid opening member 57 of the present embodiment is disposed at a position below, and in front of, the plate setting portion 42 in the setting holder 41. The lid opening member 57 includes a plate pushing portion 58 and an actuator 59. The plate pushing portion 58 is moved further above the upper surface of the plate setting portion 42, thereby pushing a lower front side of the plate 7 upward. As a result, the engagement between the elevated base 9 and the stopper 43 of the plate 7 is released, and the operating portion 53 pushes the elevated base 9 of the plate 7 forward by the biasing force of the biasing portion 54, and therefore the lid 47 is opened. In other words, when the lid opening member 57 operates, the lid 47 is automatically opened by the open/close mechanism 52 of the container 40. As shown in FIG. 4, the front lower portion of the plate 7 is laid on the stopper 43. Therefore, the plate 7 slightly tilts with respect to the horizontal plane. The actuator 59 (such as a motor or a solenoid) drives the plate pushing portion 28 in the vertical direction.

An open control unit 60 is connected to the lid opening member 57. The open control unit 60 includes a controller and controls the lid opening member 57. The open control unit 60 of the present embodiment has a plurality of seat buttons 61 each corresponding to a respective one of a plurality of seats in the restraint (the tables 104 having the seats in the present embodiment). In the present embodiment, a conveyance time after an item is placed on the conveying path 102 at a predetermined position (for example, a setting position where an item is placed on the conveying path 102 by a staff) until the item reaches a seat can be calculated in advance. The conveyance time varies depending on the target seat. When one of the plurality of seat buttons 61 is operated, the lid opening member 57 sets a timer corresponding to the conveyance time to the seat designated by the seat button 61, and causes the lid opening member 57 to open the lid 47 when the timer counts up.

(Reservation Management Process)

Referring to FIGS. 5 to 11, the reservation management process executed by the restaurant management system 1 in the present embodiment will be described. In the reservation management process, reservations for restaurants by customers are accepted and reservation information is managed. In detail, at the reservation management process of the present embodiment, the reservation information on each of a plurality of query items is appropriately acquired in the form of conversation between the customer and the restaurant through the chat screen of the communication tool. During the reservation management process of the present embodiment, in addition to the information of the reservation date and time and the number of people, information on an item selected by the customer to be provided at the restaurant (in the present embodiment, a present that is common to be presented during an anniversary, etc.) is acquired through the conversation process. The chat screen shown in FIGS. 6 to 11 is a chat screen displayed on the display unit 26 of the customer terminal 20.

As an example, the reservation management process in the present embodiment includes processing executed by the CPU 12 of the reservation management device 10 and processing executed by the CPU 22 of the customer terminal 20. The control unit of the restaurant management system 1 (in the present embodiment, the CPU 12 of the reservation management device 10 and the CPU 22 of the customer terminal 20) executes the reservation management process shown in FIG. 5 by executing the restaurant management program stored in the storage device (for example, the storage device 13 or the storage device 23). In the present embodiment, data for displaying, on the display unit, the chat screen (see FIGS. 6 to 11) between the account of the reservation management device 10 and the account of the customer terminal 20 is generated by the tool server 4 that operates the communication tool. In addition, data output from the customer terminal 20 is acquired by the reservation management device 10 via the tool server 4. Similarly, data output from the reservation management device 10 is also acquired by the customer terminal 20 via the tool server 4. In the following, however, in order to facilitate understanding of the flow of processing, the description of processing for the tool server 4 is omitted.

First, a customer who wishes to reserve a restaurant performs an operation on the operation unit 25 of the customer terminal 20 to establish a sharing state in which information can be shared through the chat screen between the account of the reservation management device 10 in the communication tool (i.e., LINE (registered trademark) in the present embodiment). In other words, the customer registers the account of the reservation management device 10 as a friend (hereinafter, referred to as "friend registration" in the present embodiment). When the operation of the friend registration is executed on the customer terminal 20 (S1: YES), the customer terminal 20 performs a process (a sharing process) for establishing the sharing state in which information can be shared through the chat screen between the account of the reservation management device 10 and the account of the customer terminal 20. As a result, in the communication tool, the sharing state between the account of the reservation management device 10 and the account of the customer terminal 20 is established (S2).

It should be noted that in the present embodiment, a plurality of accounts of the reservation management device 10 that enables sharing of information with the account of the customer terminal 20 at the step of S2 are created for the respective restaurants. Various types of data necessary for executing the reservation management process described hereinafter (for example, data for outputting designation request information described later to the chat screen, etc.) are stored in a database (for example, the storage device 13 or the cloud storage 5, etc.) for each restaurant. Accordingly, the information necessary to accept restaurant reservations is appropriately output on the chat screen according to each restaurant.

In this embodiment, in the communication tool, an information providing account is created for each restaurant to provide various information to the customer terminal 20. In addition, a link (such as a banner) is put on the chat screen created by the information providing account for each restaurant to access the reservation account of the restaurant. Accordingly, the customer is able to easily access the reservation account and make the friend registration through the information providing account of the desired restaurant. In addition, a link is put on the restaurant website to access each of the reservation accounts created for the respective restaurants. Accordingly, a customer can easily access the reservation account of the desired restaurant and make the friend registration by accessing the website and selecting the link for the desired restaurant.

When the sharing state between the account of the reservation management device 10 and the account of the customer terminal 20 is established (S2), the reservation management device 10 outputs reservation start information prompting the customer to start making a reservation operation through the chat screen (S3).

Figure 6:
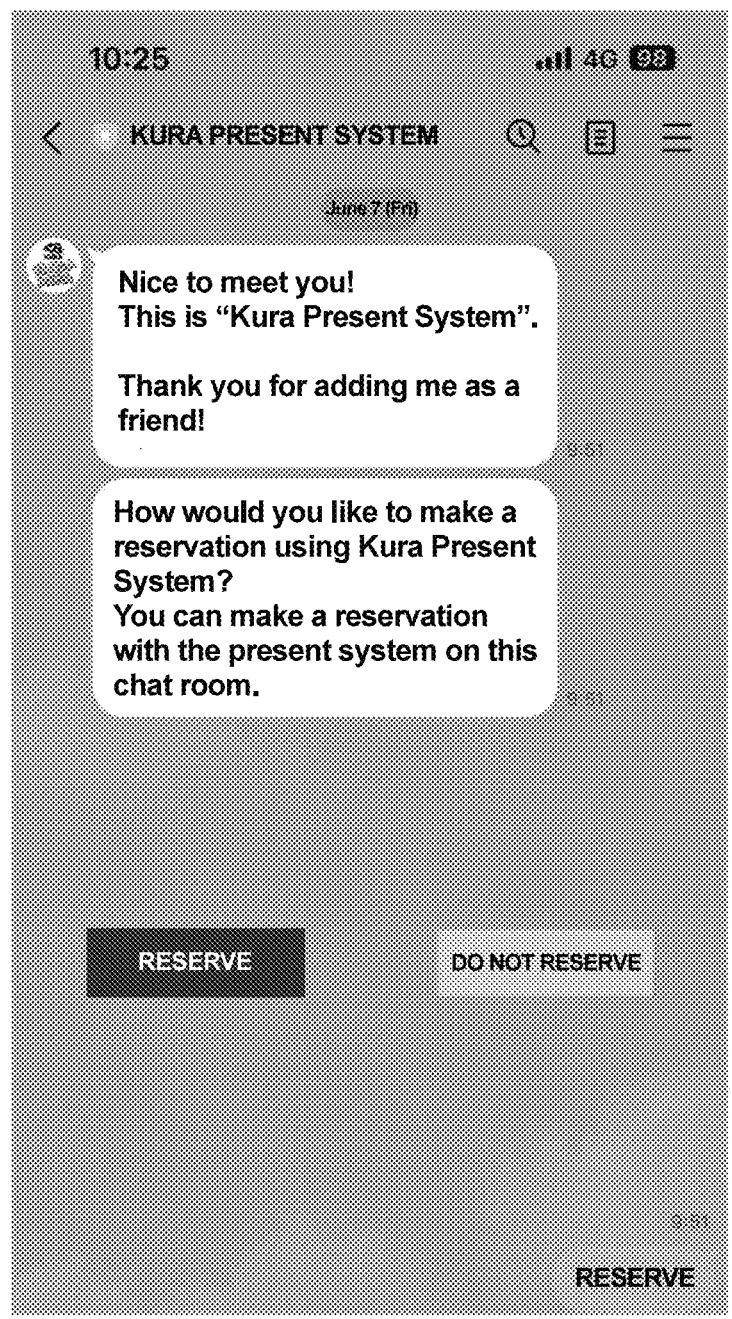
FIG. 6 shows one example of a chat screen on which reservation start information is displayed.

FIG. 6 shows an example of a chat screen on which the reservation start information is displayed. The reservation start information shown in FIG. 6 includes a message to prompt a user (a customer) to start making the reservation operation and a reservation start button (the button "reserve" in FIG. 6) that is operated by the user to input a reservation start instruction. When the customer operates the reservation start button and an instruction to start the reservation is input into the customer terminal 20 (S4: YES), the customer terminal 20 outputs a reservation start request signal to the reservation management device 10 (S5).

Also, as shown in FIG. 6, when the reservation start instruction is input into the customer terminal 20 (S4: YES), the reservation management device 10 or the customer terminal 20 outputs confirmation information indicative of completion of the input of the reservation start instruction (i.e., a message "RESERVE" in the present embodiment) on the chat screen. Accordingly, the customer may proceed to the next step after confirming that the reservation start instruction has been input correctly. Note that the confirmation information may be output on the chat screen by the tool server 5. In this case, the tool server 5 may be set in advance by a staff of the restaurant or the like so that the tool server 5 automatically outputs the confirmation information to the chat screen upon receiving the reservation start instruction.

Upon receiving the reservation start request signal (S5), the reservation management device 10 sequentially outputs a plurality of designation request information for requesting the customer to designate each of the plurality of reservation items on the chat screen (S6, S9, S12, S15). In the present embodiment, the designation request information requesting the customer to designation a present (hereinafter, referred to as a "reserved item") is output on the chat screen by the reservation management device 10 (S6).

Figure 7:
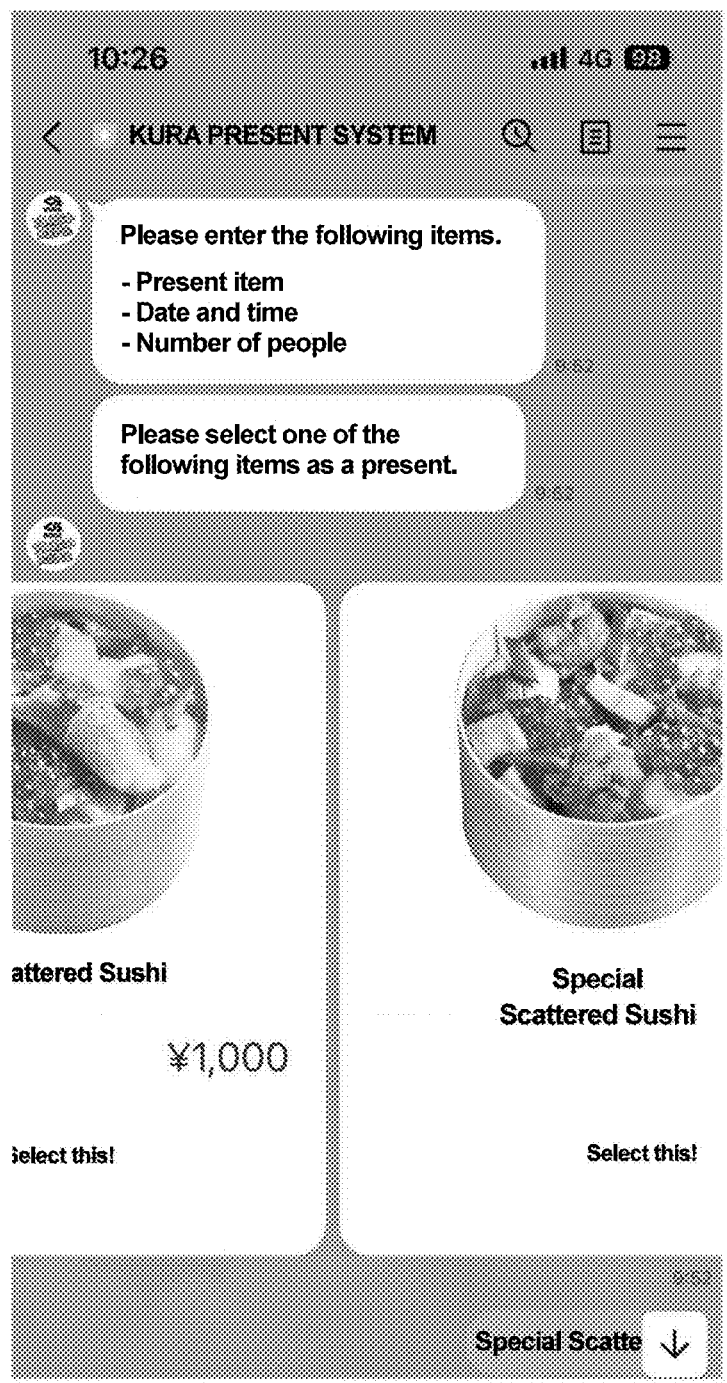
FIG. 7 is a diagram showing one example of the chat screen where designation request information for a reserved item is displayed.

FIG. 7 shows an example of a chat screen when the designation request information for the reserved item is displayed. The designation request information of the reserved item shown in FIG. 7 includes a message prompting the customer to designate the reserved item and images of a plurality of selection candidates for the reserved item. The customer can operate the operation unit 25 of the customer terminal 20 and input an instruction to designate the reserved item by simply selecting at least one candidate from among the multiple selection candidates displayed on the chat screen. Accordingly, a customer can input information necessary to make a reservation without having to enter text. It should be noted that in the example shown in FIG. 7, the customer can change the display range for the selection candidates for the reserved item by simply sliding a finger (drag operation or flick operation) on the operation unit 25, which is a touch panel.

When the customer designates one of the selection candidates as the reserved item (S7: YES), the customer terminal 20 outputs reserved item designation information indicating the designated reserved item to the reservation management device 10 (S8). In addition, as shown in FIG. 7, when an instruction to select (designate) at least one of the selection candidates as the reserved item is input (S7: YES), the reservation management device 10 or the customer terminal 20 outputs, on the chat screen, confirmation information (a message of "Special Chirashi-Sushi (special scattered sushi)" in FIG. 7) indicating the reserved item corresponding to the selected selection candidate. Accordingly, the customer can proceed to the next step by checking whether the desired present have been selected correctly. As mentioned above, the confirmation information may be output on the chat screen by the tool server 5. In this case, the tool server 5 may be set in advance by a staff of the restaurant or the like so that the tool server 5 automatically outputs the confirmation information on the chat screen in response to at least one of the selection candidates being selected. Similarly, the confirmation information described below may be output by the tool server 5.

When the reservation management device 10 acquires reserved item designation information (S8), the reservation management device 10 generates reservation information indicating that a present indicated by the reserved item designation information has been reserved. Then, the reservation management device 10 outputs designation request information requesting the customer to specify a reservation date on the chat screen (S9).

Figure 8:
FIG. 8 is a diagram showing one example of the chat screen where the designation request information for a reservation date is displayed.

FIG. 8 shows an example of a chat screen when the designation request information for the reservation date is displayed. The designation request information for the reservation date shown in FIG. 8 includes a message prompting the customer to specify the reservation date and an image showing a plurality of selection candidates for the reservation date. If the selection candidates displayed on the chat screen includes a desired date, the customer can input an instruction for designating the date as the reservation date by operating the operate unit 25 to select one of the selection candidates displayed on the chat screen. Accordingly, the customer can input information necessary to make a reservation without having to enter text.

In addition, the designation request information includes a candidate switching button (the button "SHOW FOL- LOWING DATE" in FIG. 8) for switching the plurality of selection candidates. The customer operates the candidate switching button shown on the operation unit 25 if the selection candidates for the reservation date currently displayed on the chat screen does not include a desired date. The customer terminal 20 outputs a signal indicating that the candidate switching button is selected to the reservation management device 10. The reservation management device 10 switches the selection candidates by displaying, on the chat screen, another set of the selection candidates for the reservation date that are different from those that were previously displayed. In other words, the reservation management device 10 switches the currently displayed selection candidates to the other selection candidates on the chat screen each time the customer presses the operation unit 25. Therefore, even if the number of the selection candidates that can be displayed on the chat screen at one time is limited, the customer can find a desired selection candidate by simply moving pages on the chat screen.

In some cases, a certain number of days (hereinafter, referred to as "preparation days") are required to prepare a reserved item at a restaurant. The reservation management device 10 restricts the selection candidates for the reservation date displayed on the chat screen to dates on or after the date of making a reservation plus the preparation days. Therefore, regardless of which selection candidate is selected as the reservation date through the chat screen by the customer, the reserved item can be prepared with sufficient time for the restaurant.

When the customer designates one of the selection candidates as the reservation date t (S10: YES), the customer terminal 20 outputs reservation date designation information indicating the designated reservation date to the reservation management device 10 (S8). In addition, as shown in FIG. 8, when an instruction to select (designate) at least one of the selection candidates as the reservation date is input (S10: YES), the reservation management device 10 or the customer terminal 20 outputs, on the chat screen, confirmation information (a message of "June 9" in FIG. 8) indicating the reservation date corresponding to the selected selection candidate. Accordingly, the customer can proceed to the next step by checking whether the desired reservation date have been selected correctly.

When the reservation date designation information (S11) is acquired, the reservation management device 10 generates reservation information indicating that a reservation date desired by the customer is the reservation date indicated by the reservation date designation information. Then, the reservation management device 10 outputs the designation request information for requesting the customer to designate a reservation time on the chat screen (S12).

Figure 9:
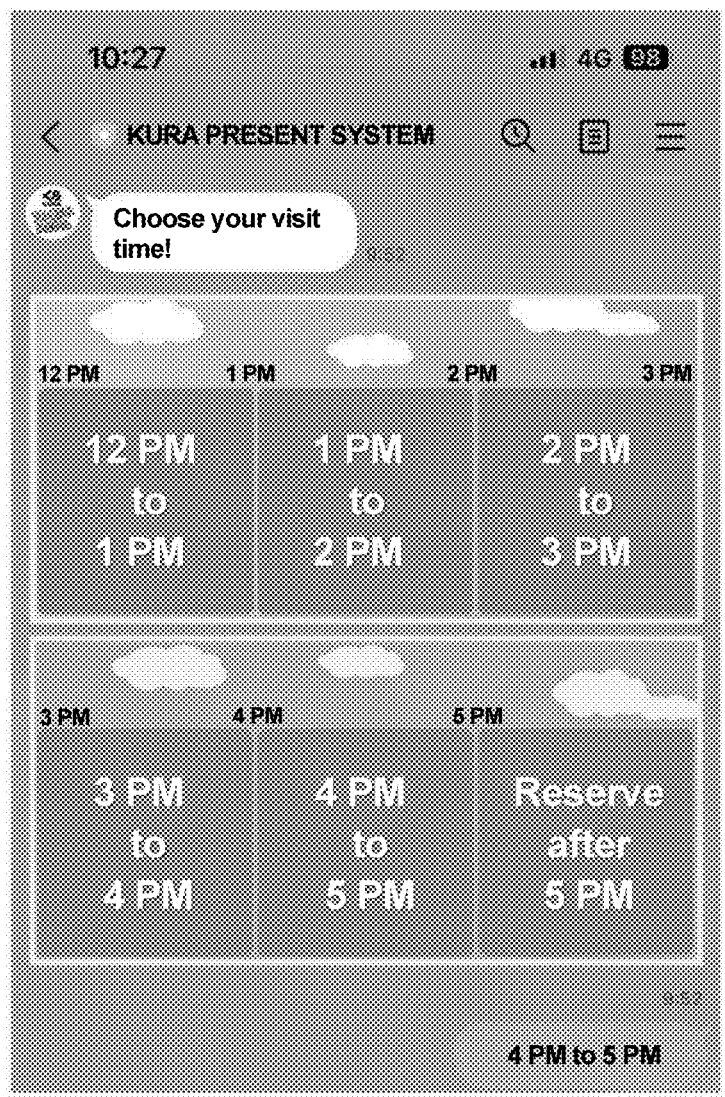
FIG. 9 is a diagram showing one example of the chat screen where the designation request information for a time range is displayed.

FIG. 9 shows an example of a chat screen when the designation request information for a reservation time range is displayed. The designation request information for the reservation time range shown in FIG. 9 includes a message prompting the customer to select one of time ranges in which the customer plans to visit the restaurant along with an image of selection candidates of a plurality of time ranges. If the selection candidates displayed on the chat screen includes a desired time range, the customer can input an instruction for selecting the time range by operating the operate unit 25 to select one of the selection candidates displayed on the chat screen.

In addition, the designation request information includes a candidate switching button (the button "RESERVE AFTER PM5" in FIG. 9) for switching to other selection candidates together with an image showing the selection candidates of the time ranges. The customer presses the candidate switching button through the operation unit 25 if the selection candidates of the time ranges currently displayed on the chat screen does not include a desired time range. The customer terminal 20 outputs a signal indicating that the candidate switching button is selected to the reservation management device 10. The reservation management device 10 switches the selection candidates by displaying, on the chat screen, the selection candidates of the time ranges that are different from those that were previously displayed. In other words, the reservation management device 10 switches the currently displayed selection candidates to other selection candidates of the time ranges on the chat screen each time the customer operates the operation unit 25.

When the customer selects a desired time range from among the selection candidates of the time ranges (S13: YES), the customer terminal 20 outputs time range selection information indicative of the selected time range to the reservation management device 10 (S14). In addition, as shown in FIG. 9, when an instruction to select (designate) at least one of the selection candidates of the time ranges is input (S13: YES), the reservation management device 10 or the customer terminal 20 outputs, on the chat screen, confirmation information (a message of "PM4:00 to PM5:00" in FIG. 9) indicating the time range corresponding to the selected selection candidate. Accordingly, the customer can proceed to the next step by checking whether the desired time range have been selected correctly.

When the reservation management device 10 acquires the time range selection information (S14), the reservation management device 10 generates reservation information indicating that the time range selected by the customer is the time range indicated by the time range designation information. Then, the reservation management device 10 outputs designation request information for requesting the customer to specify the number of people on the chat screen (S9).

Figure 10:
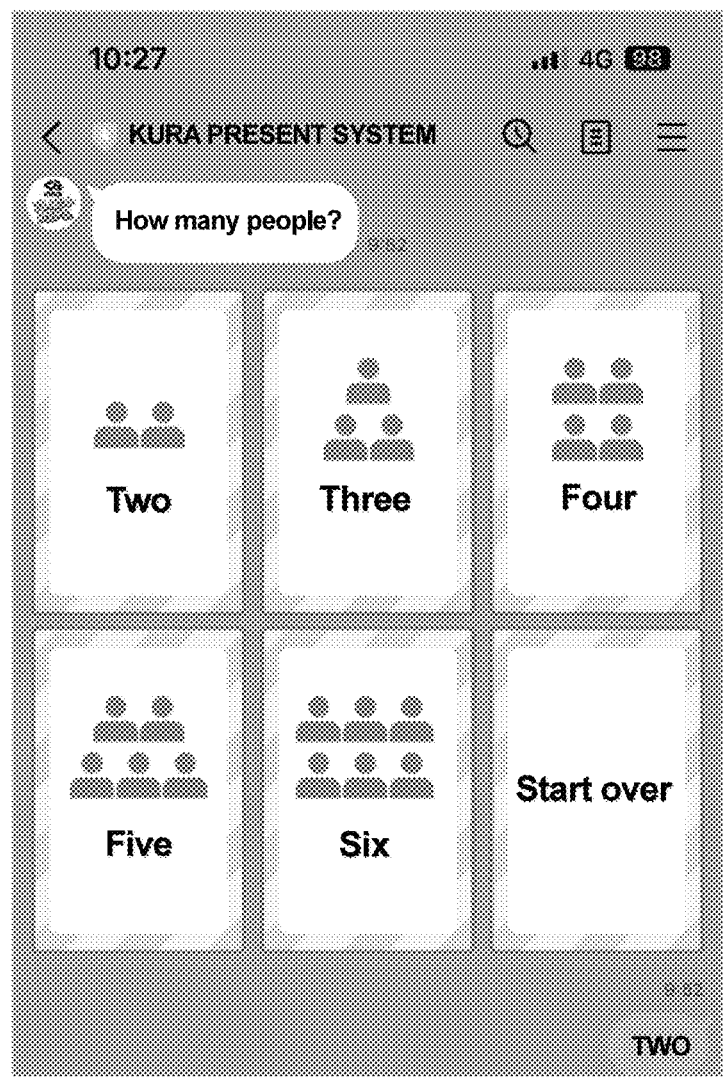
FIG. 10 is a diagram showing one example of the chat screen where the designation request information for the number of people is displayed.

FIG. 10 shows an example of a chat screen when the designation request information for the number of people is displayed. The designation request information for the number of people shown in FIG. 10 includes a message of prompting the customer to specify the number of people and an image showing a plurality of selection candidates for the number of people. The customer can input an instruction for specifying the number of people by operating the operation unit 25 and selecting one of the selection candidates for the number of people that are displayed on the chat screen.

When the customer selects one of the selection candidates as the number of people (S16: YES), the customer terminal 20 outputs reservation number information indicative of the specified number of people to the reservation management device 10 (S17). In addition, as shown in FIG. 10, when an instruction to select (designate) at least one of the selection candidates as the number of people is input (S16: YES), the reservation management device 10 or the customer terminal 20 outputs, on the chat screen, confirmation information (a message of "TWO" in FIG. 10) indicative of the number of people corresponding to the selected selection candidate. Accordingly, the customer can proceed to the next step by checking whether the desired number of people has been selected correctly.

When the reservation management device 10 acquires the reservation number information (S17), the device 10 generates reservation information indicating that the number of people who plan to visit the restaurant is the number indicated by the reservation number information. Next, the reservation management device 10 outputs image upload request information on the chat screen (S18). The image upload request information is information for requesting a customer to upload data of an image. The uploaded image will be displayed to customers at the restaurant.

Figure 11:
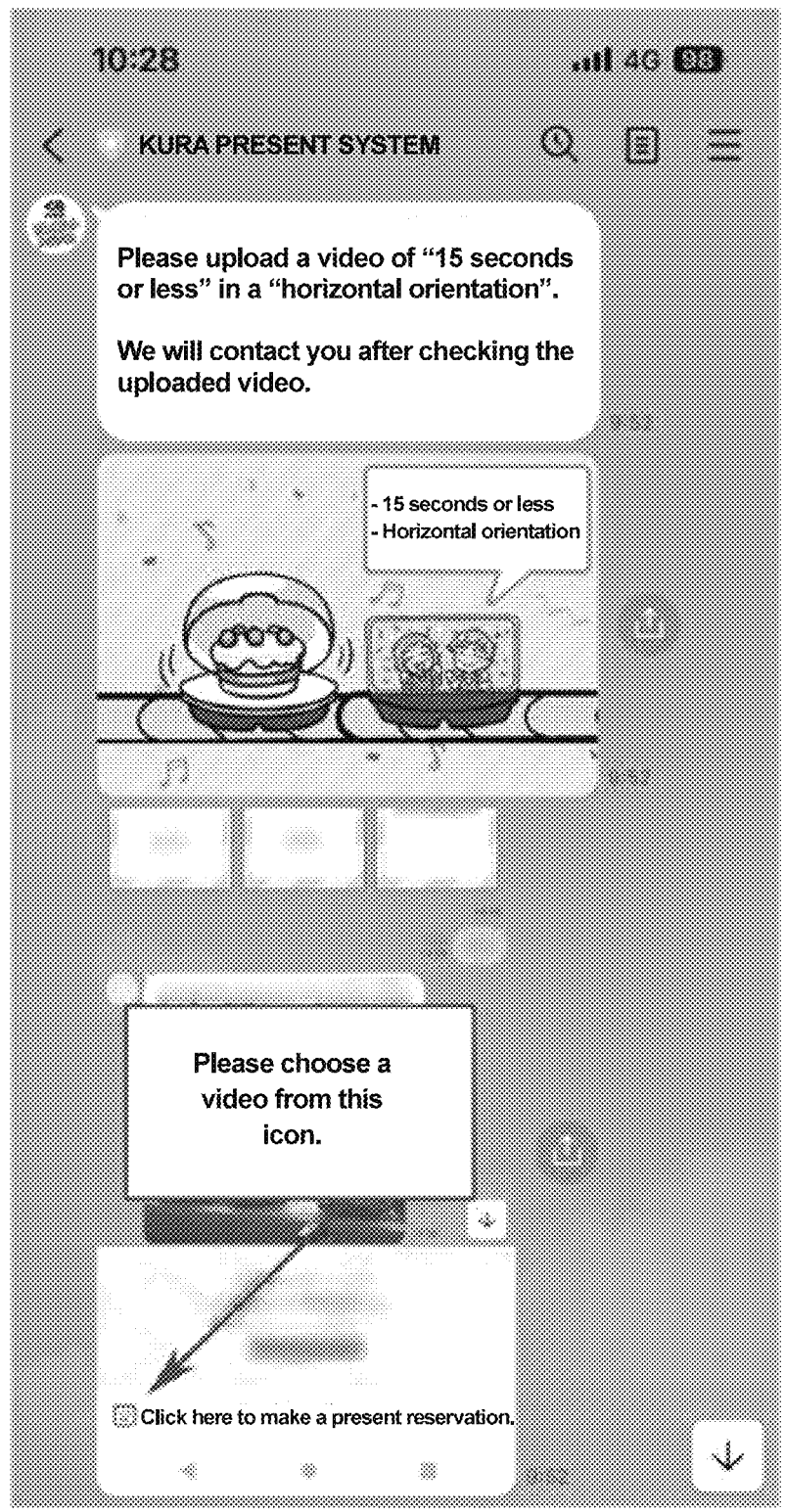
FIG. 11 shows a diagram showing one example of the chat screen where image upload request information is displayed.

FIG. 11 shows an example of a chat screen when the image upload request information is displayed. The image upload request information shown in FIG. 11 includes a message of prompting the user to upload an image (e.g., video in the present embodiment) and information of explaining conditions of image data that can be uploaded (the maximum playback time of the video and the orientation (horizontal orientation) of the video in this example shown in FIG. 11). Accordingly, the customer can upload data of the image that matches the conditions by checking the conditions displayed on the chat screen. Further, the image upload request information shown in FIG. 11 includes information of explaining the procedure of uploading the data of the image using the customer terminal 20. Therefore, the customer can upload the image data easily and appropriately by following the procedure displayed on the chat screen.

When an instruction to specify (select) the image data to be uploaded is input by the customer through the operation unit 25 (S19: YES), the customer terminal 20 transmits the image data specified by the customer to the reservation management device 10 (S20). Accordingly, in addition to the information of the reservation date and time, the number of reservation people, and the reserved item, the data of the image to be provided in the restaurant is also acquired by the reservation management device 10 through the chat screen.

When the reservation management device 10 acquires the image data, the device 10 stores the acquired image data in the cloud storage 5 (see FIG. 1). Accordingly, the restaurant terminal 30 disposed in the restaurant can provide the image to the customer at the restaurant by acquiring the image data from the cloud storage 5 via the network 2 even if the image data is not transmitted from the reservation management device 10. In addition, the reservation management device 10 displays a list of reservation contents specified by the customer and reservation result confirmation information including a reservation number, etc., on the chat screen (S21). The reservation management device 10 executes reservation information storage process (S22) for the storage device (the storage device 13 or the cloud storage 5, etc.) to store the reservation information indicative of the reservation contents input during the processes of S1 to S20.

As described above, according to the reservation management process of the present embodiment, the customer can easily and appropriately specify the reservation contents by simply specifying the reservation contents requested by the designation request information step by step through the chat screen each time the designation request information is displayed on the chat screen. In other words, multiple pieces of the reservation information are properly acquired through chat conversation between the customer and the restaurant side on the chat screen. Therefore, multiple pieces of information necessary for making a restaurant reservation can be acquired from a customer through a clear, simple procedure.

(Post-Reservation Inquiry Process)

Figure 12:
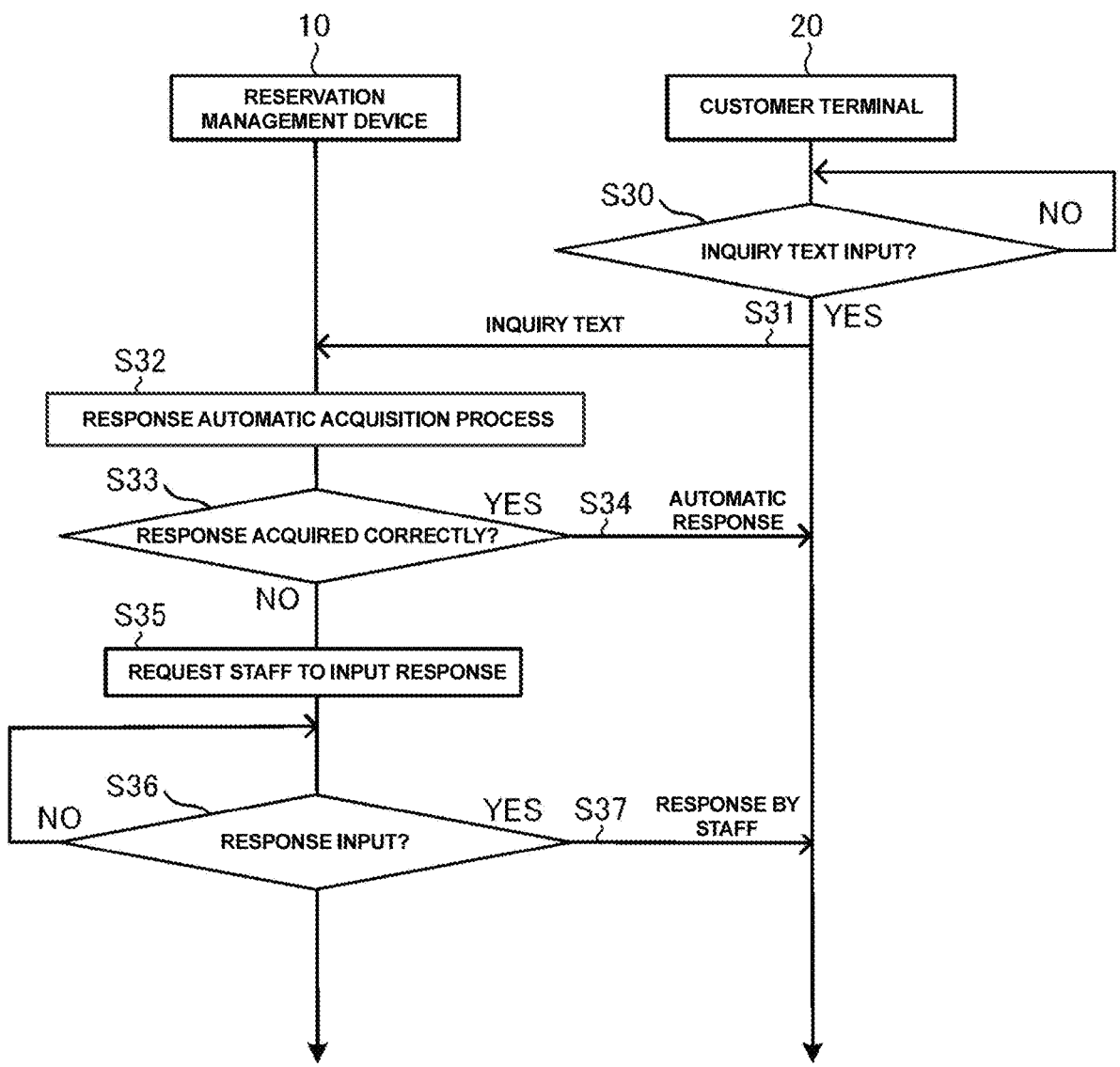
FIG. 12 is a timing chart of a post-reservation inquiry process executed by the restaurant management system according to the present embodiment.

Referring to FIG. 12, a post-reservation inquiry process executed by the restaurant management system 1 in the present embodiment will be described. At the post-reservation inquiry process, after the reservation was completed at the reservation management process (see FIG. 5), a customer inquiry is received through the chat screen (the chat screen for reservation between the account of the reservation management device 10 and the account of the customer) of the communication tool that was used in the reservation management process. Furthermore, at the post-reservation inquiry process in the present embodiment, a response to the inquiry received on the chat screen is also displayed on the same chat screen.

The control unit of the restaurant management system 1 (in the present embodiment, the CPU 12 of the reservation management device 10 and the CPU 22 of the customer terminal 20) executes the post-reservation inquiry process shown in FIG. 12 by executing the restaurant management program stored in the storage device (for example, the storage device 13 or the storage device 23).

The customer who wishes to make an inquiry to the reserved restaurant inputs, by operating the operation unit 25 of the customer terminal 20, inquiry text on the chat screen of the communication tool that was used when making the reservation. When the inquiry text is input by the customer (S30: YES), the customer terminal 20 displays the input inquiry text on the chat screen (S31). When the reservation management device 10 acquires the inquiry text (S31), the device 10 executes a process of automatically acquiring an answer to the inquiry based on the acquired inquiry text (S32).

The method of an automatic response acquisition process (S32) may be changed accordingly. For example, a rule may be made in advance for determining responses to inquiry texts based on words and the like in the inquiry texts. At an automatic response creation process, the reservation management device 10 may automatically acquire a response by analyzing words and the like in the inquiry text and applying the analyzed words and the like to the rule.

In addition, the reservation management device 10 may acquire an answer output by a mathematical model as an answer to the customer by inputting the inquiry text accepted at the inquiry reception step into the mathematical model that has been trained by a machine learning algorithm. The mathematical model may be trained in advance to output responses to inquiries by inputting inquiry texts into the mathematical model. For example, the mathematical model may be trained in advance by a machine learning algorithm using inquiry texts as input training data and correct answers to the inquiry texts as output training data. In this case, the answers to the inquiry texts are automatically acquired with a higher accuracy.

At S33, the reservation management device 10 determines whether the answer has been properly acquired at the automatic answer acquisition process (S32). If the answer is properly acquired (S33: YES), the reservation management device 10 outputs the answer automatically acquired at S32 on the same chat screen into which the inquiry text was input (S34). As a result, the customer can quickly and accurately understand the answers to their queries.

On the other hand, there is a possibility that answers may not be properly acquired at the automatic answer acquisition process (S32). If the answer is not properly acquired (S33: NO), the reservation management device 10 executes a process of asking a staff to input an answer by various means such as e-mail or a communication tool (S35). Thereafter, the process is in a standby state until the answer is input by the staff (S36: NO). When the answer is input by the staff (S36: YES), the reservation management device 10 outputs the answer input by the staff on the same chat screen into which the inquiry text was input (S37). In this way, even if an appropriate response to an inquiry is not automatically acquired, the response to the customer is appropriately made.

As described above, according to the post-reservation inquiry process in the present embodiment, the customer can input the text of the inquiry as to the restaurant using the chat screen that was also used when making the reservation. Therefore, customers can easily make inquiries to restaurants even if they need to do so after their reservations were made.

(Reservation List Information Output Process)

Referring to FIG. 13, a list reservation information display process executed by the restaurant management system 1 (the restaurant terminal 30 of the restaurant management system 1 in the present embodiment) will be described. The restaurant terminal 30 of the present embodiment acquires the reservation information on its own restaurant among a plurality of pieces of the reservation information on restaurants acquired at the reservation management process (see FIG. 5). The restaurant terminal 30 of the present embodiment acquires one or more sets of pieces of the reservation information on a particular reservation date (e.g., the reservation date is on the day or the next day) among reservation information regarding its own restaurant. Such reservation information may be transmitted from the reservation management device 10 to the restaurant terminal 30. Further, if the reservation information is stored in the cloud storage 5, the restaurant terminal 30 may acquire the reservation information from the cloud storage 5. The restaurant terminal 30 outputs a list of the reservation information on the particular reservation date among the reservation information regarding its own restaurant. The method for outputting the list of the reservation information may be changed. For example, the CPU 32 of the restaurant terminal 30 may output a list by having at least one of the display unit 36 of the restaurant terminal 30 and the staff display device 39 display the list of reservation information. In addition, the CPU 32 of the restaurant terminal 30 may output the list by controlling a printer to print out a paper list of reservation information.

FIG. 13 shows an example of a list of reservation information with a particular reservation date output by the restaurant terminal 30. As illustrated in FIG. 13, the list of reservation information shows the reservation information regarding a particular restaurant (the restaurant at ABC in FIG. 13) on a particular date (Jul. 1, 2024 in FIG. 13) among the reservation information acquired at the reservation management process (see FIG. 5). The list of the reservation information includes, at a minimum, the reservation date and time, the file name of the uploaded video, and the reserved item information; Therefore, staffs of the restaurant can work by checking the list to know the number of reservation information, the reservation time, the reserved items, etc. on a particular date. Accordingly, the restaurant can operate smoothly.

(Customer Reception Process)

Figure 14:
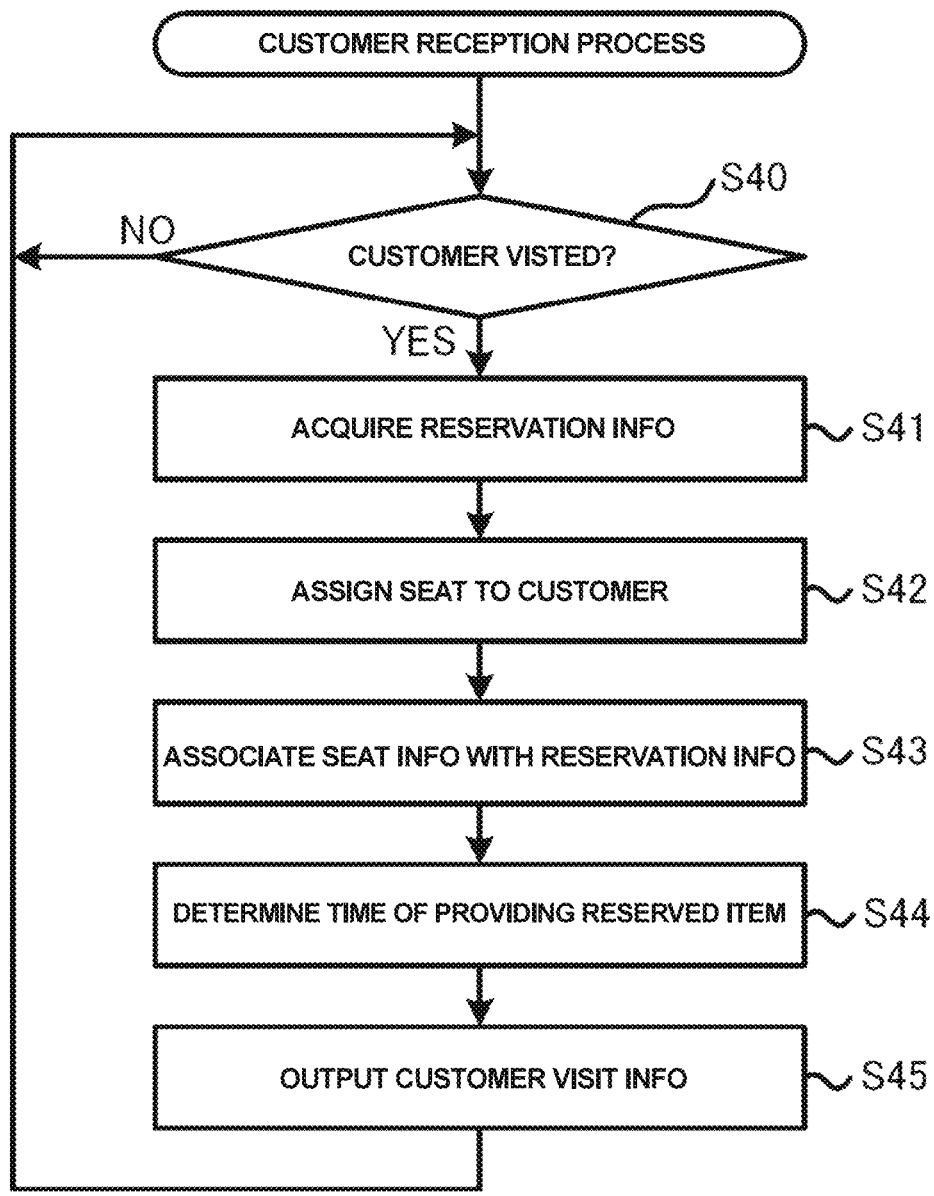
FIG. 14 is a flowchart of a customer reception process executed by the restaurant management system (the restaurant terminal) according to the present embodiment.

Referring to FIGS. 14 and 15, a customer reception process executed by the restaurant management system 1 (the restaurant terminal 30 of the restaurant management system 1 in the present embodiment) will be described. At the customer reception process, when the customer who made a reservation at the reservation management process (see FIG. 5) visits the restaurant, customer visit information including information of the seat assigned to the customer and information of the reserved item is output. Furthermore, at the customer reception process in the present embodiment, a scheduled time at which the reserved item will be provided to the customer (a rough scheduled time in the present embodiment) is determined according to the type of the reserved item. The determined schedule time is also included in the customer visit information. The customer reception process is executed by the CPU 32 of the restaurant terminal 30 in accordance with the restaurant management program stored in the memory 33. The customer reception process is performed at least during restaurant hours.

As shown in FIG. 14, the restaurant terminal 30 determines whether the customer who made the reservation at the reservation management process (see FIG. 5) has visited the restaurant (S40). In the present embodiment, when the customer comes to the restaurant, the fact that the customer has visited the restaurant is input into the restaurant terminal 30 by, e.g., entering a reservation number into the restaurant terminal 30 or reading an identifier given to the customer in advance. Accordingly, the restaurant terminal 30 can recognize that the customer has visited the restaurant and identify the customer who has visited the restaurant. If the person who made the reservation has not come to the restaurant (S40: NO), the step of S40 is repeated to be in a waiting state.

When the restaurant terminal 30 determines that the customer has visited the restaurant (S40: YES), the terminal 30 acquires the reservation information regarding the customer (the person who visited the restaurant) identified by the reservation number or the identifier, etc., among the plurality of pieces of the reservation information acquired at the reservation management process (see FIG. 5). As described above, the reservation information may be transmitted from the reservation management device 10 to the restaurant terminal 30. Further, if the reservation information is stored in the cloud storage 5, the restaurant terminal 30 may acquire the reservation information from the cloud storage 5.

The restaurant terminal 30 sequentially updates vacant seat information indicating the availability of the plurality of seats in the restaurant. The restaurant terminal executes a seat assigning process to automatically assign one or more empty seats to the visiting customer(s) based on the vacant seat information at that time and the number of the visiting customers (S42). It should be noted that the information of the number of customers actually inputted into the restaurant terminal 30 by the visiting customer may be used as the information of the number of customers. Alternatively, the information of the number of customers included in the reservation information regarding the visiting customer(s) may be used as the information of the number of customers. The restaurant terminal 30 associates the seat information indicative of the seat assigned to the customer who made a reservation at S42 with the reservation information on the customer who visited the restaurant (S43).

The restaurant terminal 30 determines the scheduled time at which the reserved item will be provided to the customer (in the present embodiment, the rough scheduled time at which the reserved item will be provided) according to the time of visit to the restaurant (e.g., the time at which the customer visits the restaurant) and the type of the reserved item indicated by the reservation information for the customer (S44). Depending on the type of the reserved item, the preferred timing of providing the reserved item to the customer is often different. For example, if the reserved item is a dessert, it is desirable to serve it at a later timing as compared to a food or drink other than the dessert as the reserved item. Accordingly, the time of providing the reserved item is determined according to the type of the reserved item and the time of visit, so that the reserved item is provided to a customer at the appropriate time according to the type of the present.

The restaurant terminal 30 outputs the customer visit information including the seat information of the customer who visited the restaurant and the reserved item information included in the reservation information for the customer who made the reservation (S45). The process then returns to S40. As an example, the restaurant terminal 30 of the present embodiment outputs the customer visit information by having the customer visit information displayed on the staff display device 39 (see FIGS. 1 and 2) through which staffs can make a confirmation. However, it is also possible to change the method for outputting the customer visit information. For example, the restaurant terminal 30 may output the customer visit information by controlling a printer to print out the customer visit information.

FIG. 15 shows an example of the customer visit information displayed on the staff display device 39. As shown in FIG. 15, the customer visit information includes the seat, the reservation time, the time at which the customer had a seat (which may be the visit time at which the customer visited the restaurant), the file name of the video, the reserved item, and the information of the time of providing each reserved item. By checking the customer visit information outputted by the restaurant terminal 30, the staffs of the restaurant can appropriately recognize the seat information of the customer who made the reservation and came to the restaurant and the information of the reserved item which was requested in advance. Accordingly, the reserved item can be properly provided to the seat of the customer who made the reservation. In addition, by outputting, along with the type of the reserved item, the providing time determined according to the type of the reserved item and the visit time, staffs can provide the reserved item to the customer at the appropriate time according to the type of the present. Further, in the present embodiment, the customer visit information is continuously displayed until the confirmation button displayed on the staff display device 39 is pressed by a staff. Therefore, the staffs are less likely to overlook the customer visit information.

(Event Control Process)

Next, the event control process executed by the restaurant management system 1 in the present embodiment will be described. In the event control process, an event is performed by an event execution device when the event execution device conveyed by the conveying path 102 reaches the seat assigned to a customer (a visitor). Therefore, an event such as a celebration is carried out at a proper timing, making it possible to fully entertain customers in the restaurant.

In the present embodiment, the event is performed based on at least one of the information and data acquired at the reservation management process (see FIG. 5) (e.g., the information of the reserved item and the image data (a video in the present embodiment)). Accordingly, in the present embodiment, in addition to the reservation for the restaurant being properly made, when the customer comes to the restaurant on the reservation date and time, the reserved item designated by the customer and the event using at least one of the video provided by the customer are executed at an appropriate timing. However, by changing a part of the event control process of the present embodiment, the event may be performed at a timing at which the event execution device reaches a seat of a target customer even if the customer has not made a reservation for the event at the reservation management process (see FIG. 5). Alternatively, an event may be performed based on information on the seat assigned to the customer without any reservation information.

First, the event execution device will be explained. In the present embodiment, at least one of the display device 70 (see FIG. 1), the speaker 75 (see FIG. 1), and the container 40 (see FIGS. 1, 3, and 4) may be used as the event execution device. In the following, all the display device 70, the speaker 75, and the container 40 are used as the event execution device. However, one or some of the display device 70, the speaker 75, and the container 40 may be used as the event execution device. In addition, another event execution device (e.g., at least one of a robot that starts operating based on a driving instruction and a light source that starts emitting light based on a lighting instruction) may be used as the event execution device together with at least one of the display device 70, the speaker 75, and the container 40 or separately from the display device 70, the speaker 75, and the container 40.

As mentioned above, the display device 70 is provided with the display unit 71 and the control unit 72. The control unit 72 serves as a display control unit for controlling the display unit 71 to display images. In the present embodiment, a smartphone is used as the display device 70. Accordingly, in the present embodiment, the display device 70 is placed on the plate 7 and conveyed on the conveying path 102. In the present embodiment, the video data provided by the customer at the reservation management process (see FIG. 5) is played by the display device 70. Therefore, the customer who made a reservation can be fully entertained. However, other video data can be played on the display device 70. It is also possible to control the timing of start displaying a still image.

Also, in the present embodiment, the speaker 75 is conveyed on the conveying path 102 with the display device 70 being connected to the speaker 75. The control unit 72 of the display device 70 serves as a voice control unit that controls generation of audio sound (reproduction of audio data) by the speaker 75. In the present embodiment, audio data stored in the memory device of the display device 70 (for example, audio data accompanying video data provided by the customer at the reservation management process (see FIG. 5), or audio data provided or designated by the customer, etc.) is played by the speaker 75.

The container 40 is provided with the lid 47 that can be opened and closed, as described above. By closing the lid 47, an item is housed inside the container 40. The container 40 includes the lid opening member 57 that automatically opens the lid 47. The open control unit 60 is connected to the lid opening member 57 and controls the lid opening member 57. Accordingly, by appropriately controlling the timing at which the open control unit 60 opens the lid 47 of the container 40, an event using the container 40 can be properly performed. The container 40 and the open control unit 60 are closely connected to each other and conveyed on the conveying path 102.

In the present embodiment, when the container 40 is used as the event execution device, the container 40 houses a specific item (e.g., the reserved present). As an example, when the event control process in the present embodiment is executed, the reserved item indicated by the reservation information associated with the seat information at S43 of the customer reception process (see FIG. 14) (i.e., the reserved item selected by the target customer for which the event will be performed) is housed in the container 40 in advance by a staff. Thus, according to the restaurant management system 1 of the present embodiment, in addition to the reservation for the restaurant including the designation of the reserved item being appropriately made, when the customer visits the restaurant on the reserved date and time, the reserved item that was selected in advance is conveyed to the customer's seat on the conveying path 102 while the reserved item is housed in the container 40. Furthermore, when the container 40 reaches the customer's seat by the conveying path 102, the lid 47 of the container 40 is automatically opened and the reserved item housed in the container 40 is disclosed to the outside. Therefore, a celebration or another event is performed appropriately, so that the customers in the restaurant can be fully entertained. However, the event may be performed with an item, such as a food, a beverage, a drink, a product, goods, or the like, other than the reserved item that is housed in the container 40.

Figure 16:
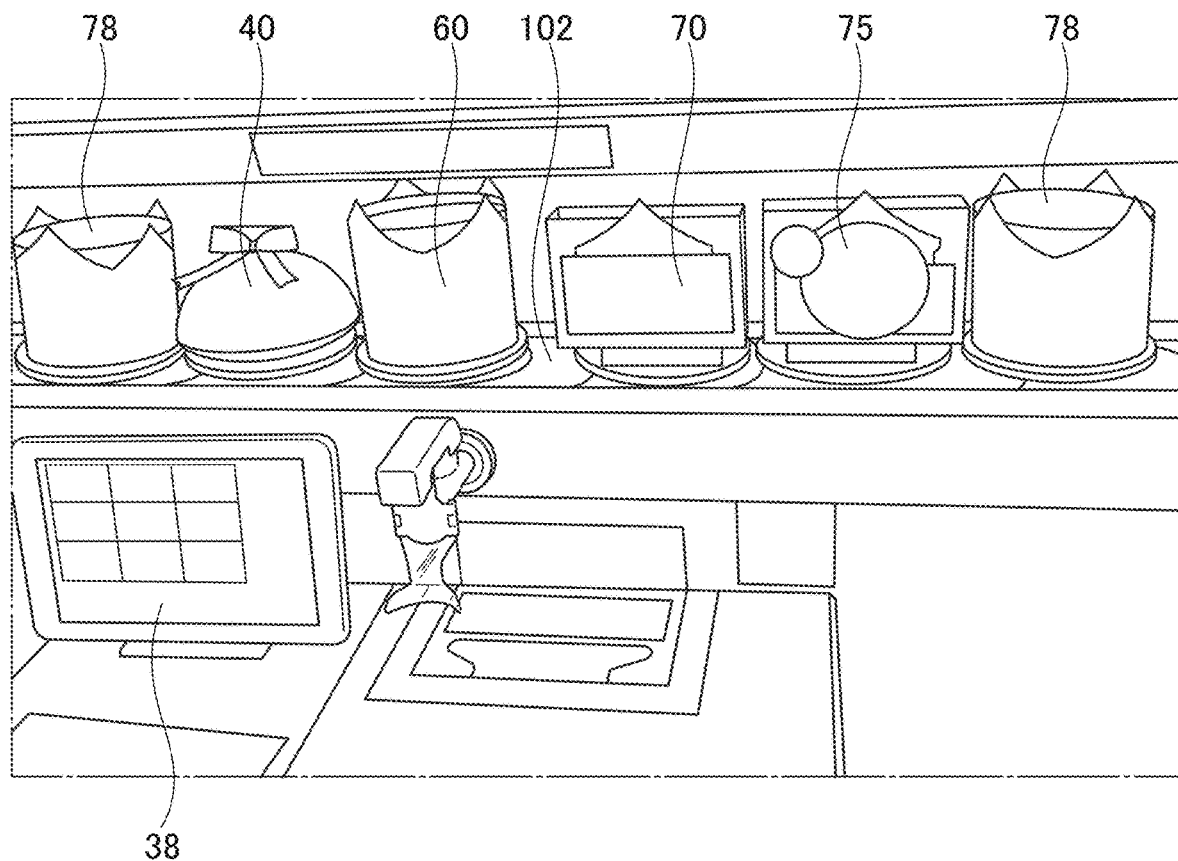
FIG. 16 is a diagram showing one example of an event execution device conveyed on a conveying path.

Referring to FIG. 16, an example of operation of the event execution device will be explained. FIG. 16 is a diagram showing an example of the event execution device that is being conveyed on the conveying path 102. In the present embodiment, an event control process is executed with the display device 70, the open control unit 60, and the container 40 that are arranged in order from the downstream side of the conveying path 102. In detail, in the present embodiment, a first decoration (an ornament) 78, the speaker 75, the display device 70, the open control unit 60, the container 40, and a second decoration (an ornament) 78 are conveyed on the conveying path 102 in this order from the downstream side of the conveying path 102. Each of the two decorations 78 is decorated to liven up the event. The number of decorations 78 may be changed or the decorations 78 may be eliminated. In addition, the arrangement order of the speaker 75 and the display device 70 may be reversed, and the arrangement order of the open control unit 60 and the container 40 may be reversed.

First, the speaker 75 and the display device 70 are conveyed first among the plurality of components of the event execution device to the seat of the target customer. The target customer recognizes that the event has started by playing the audio sound by the speaker 75 and displaying images (a video in the present embodiment) by the display device 70. Thereafter, the open control unit 60 and the container 40 are conveyed to the customer's seat. When the container 40 reaches the seat of the target customer, the lid 47 of the container 40 is automatically opened so that an item inside the lid 47 (the reserved present in the present embodiment) can be seen by the target customer. Thus, it is possible to fully entertain the customer by performing the event in this order as described above.

It should be noted that each of the decorations 78, the speaker 75, the display device 70, and the open control unit 60 is conveyed on the conveying path 102 while each of them is placed on a holder (a plate in the present embodiment). The display device 70 is electrically connected to the speaker 75 because the display device 70 also serves as an audio control unit for controlling the speaker 75 to play an audio sound. Accordingly, the holder for the speaker 75 and the holder for the display device 70 are physically connected to each other. In addition, the open control unit 60 is electrically connected to the lid opening member 57 of the container 40. Accordingly, the holder for the open control unit 60 and the container 40 with the lid opening member 57 are physically connected to each other. However, it is also possible to change the arrangement order of the components of the event execution device on the conveying path 102. As mentioned above, the audio control unit controlling the speaker 75 may be a different control unit from the control unit 72 of the display device 70.

Figure 17:
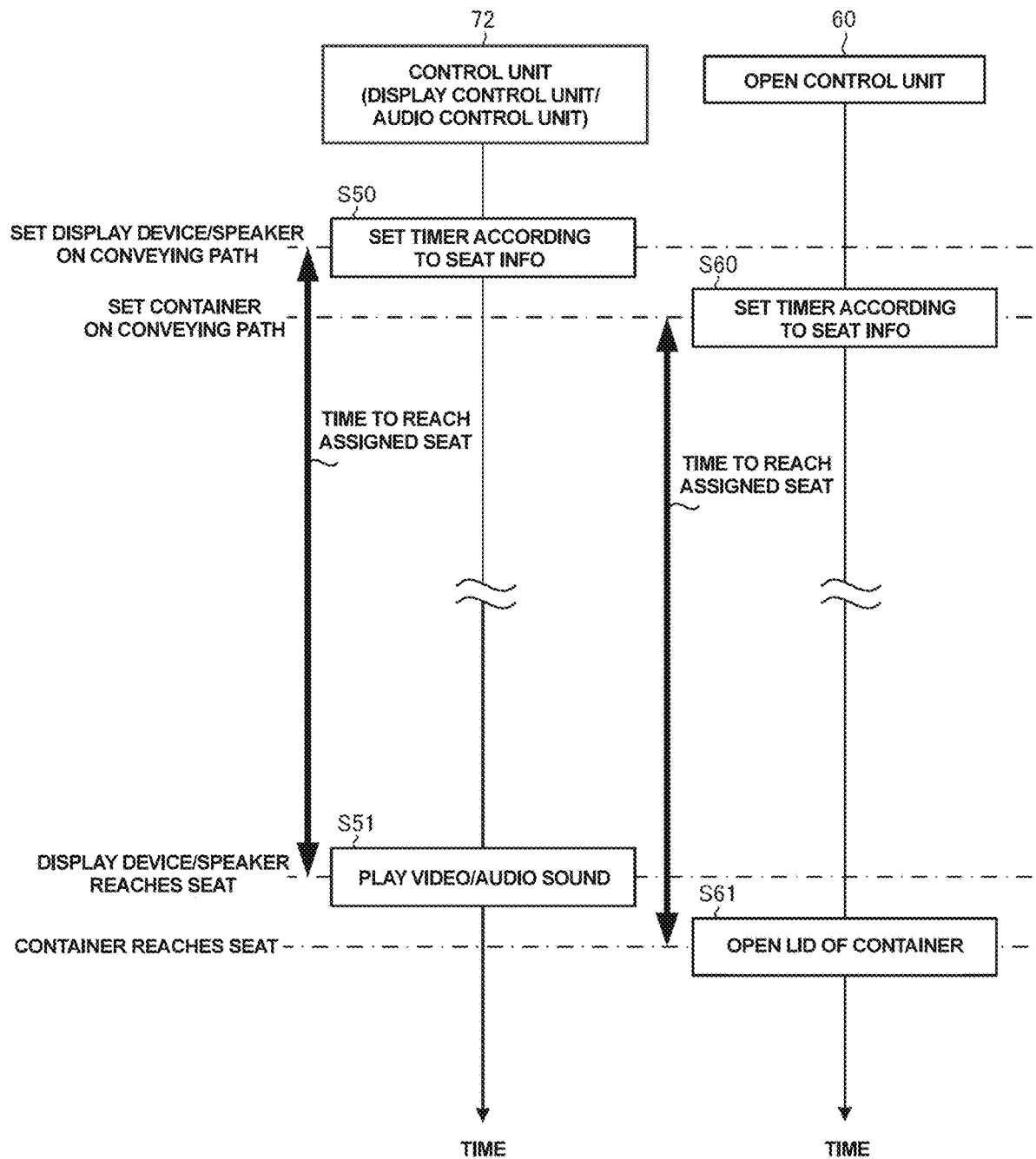
FIG. 17 is a timing chart of an event control process executed by the restaurant management system (a control unit 2 and an open control unit) according to the present embodiment.

Referring to FIG. 17, the event control process executed by the restaurant management system 1 in the present embodiment will be described. FIG. 17 is a timing chart showing the event control process executed by the control unit 72 (which serves as the display control unit and the audio control unit) of the display device 70 and the event control process executed by the open control unit 60 with time. In the example shown in FIG. 17, the event control process is executed with the speaker 75, the display device 70, the open control unit 60, and the container 40 arranged in this order from the downstream side of the conveying path 102 as described above. Note that Japanese Patent Application 2024-006885 filed by the applicant is incorporated by reference herein.

In the present embodiment, the speaker 75, the display device 70, the open control unit 60, and the container 40 are placed on the conveying path 102 by a staff in this order at a predetermined setting position in the conveying path 102. The conveyance time from the timing at which an item is placed on the conveying path 102 at the predetermined setting position to the timing at which the item reaches a target seat can be calculated in advance. The conveyance time varies depending on the target seat. In this implementation, the conveyance time is calculated in advance for each seat.

First, the control unit 72 sets a timer according to the conveyance time necessary for the speaker 75 and the display device 70 to reach the seat of the target customer for which the event will be performed when the speaker 75 and the display device 70 are placed on the conveying path 102 at the predetermined setting position (S50). As mentioned above, in the present embodiment, at S43 of the customer reception process (see FIG. 14), the seat information indicating the seat assigned to the customer is associated with the reservation information of the target customer. At S50, the timer is set according to the seat indicated by the seat information associated with the reservation information.

Note that in the present embodiment, a staff confirms the seat information associated with the reservation information by the customer visit information (see FIG. 15). The staff sets the timer for the seat indicated by the confirmed seat information (set a time corresponding to the conveyance time necessary for the event execution device to reach the target seat) using a dedicated application installed in the display device 70. However, the method for the control unit 72 to set the timer for the seat can be changed accordingly. For example, the control unit 72 may acquire, from the restaurant terminal 30, the seat information of the target customer for which the event will be performed. The control unit 72 may automatically set the timer for the seat of the target customer based on the acquired seat information. In this case, the timer can be set more easily and appropriately.

Then, the open control unit 60 also sets the timer according to the conveyance time necessary for the container 40 to reach the seat of the target customer when the container 40 is placed on the conveying path 102 at the predetermined setting position (S60). Note that in the present embodiment, as with S50, a staff confirms the seat information associated with the reservation information by the customer visit information (see FIG. 15). The staff sets the timer in the open control unit 60 for the seat indicated by the confirmed seat information (i.e., sets the time corresponding to the conveyance time necessary for the container 40 to reach the seat). As mentioned above, the open control unit 60 in the present embodiment has the seat buttons 61 disposed in each of the plurality of seats in the restaurant. The open control unit 60 sets the timer according to the conveyance time for the seat designated by the seat designation button 61 when one of the buttons 61 is pressed. However, the method for setting the timer for the seat by the open control unit 60 may be changed accordingly. For example, the open control unit 60 may acquire the seat information of the target customer for which the event will be performed from the restaurant terminal 30 and may automatically set the timer for the seat of the target customer based on the acquired seat information.

As shown in FIG. 17, the control unit 72 starts playing the audio data from the speaker 75 and playing the video data from the display unit 71 when the timer set at S50 has counted up the conveyance time (S51). The timing at which the timer set by S50 counts up is close to the timing at which the speaker 75 and the display device 70 reach the seat of the target customer. Thus, the event with the video and audio can be performed at an appropriate timing.

In addition, the open control unit 60 executes a lid opening process to open the lid 47 of the container 40 by controlling the lid opening member 57 when the timer set by S60 has counted up (S61). The timing at which the timer set at S60 counts up is close to the timing at which the container 40 reaches the seat of the target customer. Therefore, the event involving the container 40 can be performed at an appropriate timing.

It should be noted that in the present embodiment, the display device 70 and the container 40 are arranged in a row on the conveying path 102. In the example shown in FIG. 17, the timing at which the images are displayed by the display device 70 and the timing at which the lid 47 of the container 40 are opened such that the two timings have a predetermined time difference or less. Accordingly, the timing of displaying the image and the timing of opening the lid 47 of the container 40 are appropriately set such that the customers in the restaurant can be further entertained. Furthermore, in the present embodiment, since the display device 70 is arranged downstream of the container 40 in the conveyance direction, the display device 70 reaches the customer's seat earlier than the container 40. In the present embodiment, the timing of displaying the image by the display device 70 is earlier than the timing of opening the lid 47 of the container 40. Accordingly, the event using the display device 70 and the container 40 together can be appropriately performed.

(Event Control Process Using Prepared Images)

In the above description, an event is performed by controlling the display device 70 to display images uploaded or selected by a customer. However, the restaurant management system 1 may also perform an event by displaying images, which were prepared in advance by the restaurant side, on the display device 70. The control unit 72 may display an event image (which may be a video or a still image) associated with the step of opening the lid 47 of the container 40 (for example, S61 of FIG. 17) in the step of displaying an image on the display device 70 (for example, S51 of FIG. 17).

As an event image associated with the step of opening the lid 47 of the container 40, for example, an image (an attention guiding image) prompting the customer to pay attention to the container 40 before the lid 47 is opened may be displayed on the display device 70. In this case, the customer's attention is easily drawn to the container 40 before the lid 47 is opened. In other words, the customer is less likely to overlook an event during which the lid 47 is opened thanks to the attention guiding image.

As an event image associated with the step of opening the lid 47 of the container 40, for example, an image (a taking-out guiding image) prompting the customer to take an item from the container 40 after the lid 47 was opened may be displayed on the display device 70. In this case, thanks to the taking-out guiding image, it is possible to avoid a situation where the item placed in the container 40 moves to the table 104 of another customer without being taken by the target customer.

As the event image associated with the step of opening the lid 47 of the container 40, for example, an image for celebrating the customer (a celebration image) may be displayed on the display device 70 if the item in the container 40 to be provided to the customer is a celebrating gift. In this case, the celebration image further enlivens up the event during which the lid 47 is opened.

It is also possible to change the contents of the image for the event associated with the step of opening the lid 47 of the container 40. For example, an image that notifies the customer of the contents of an item in the container 40 (an item notification image) may be displayed on the display device 70. In addition, regardless of whether the event is performed in any table 104, when the timing at which the display device 70 reaches the table 104 matches the timing at which the display device starts displaying the image for the event, the event can be appropriately livened up.

Figure 18:
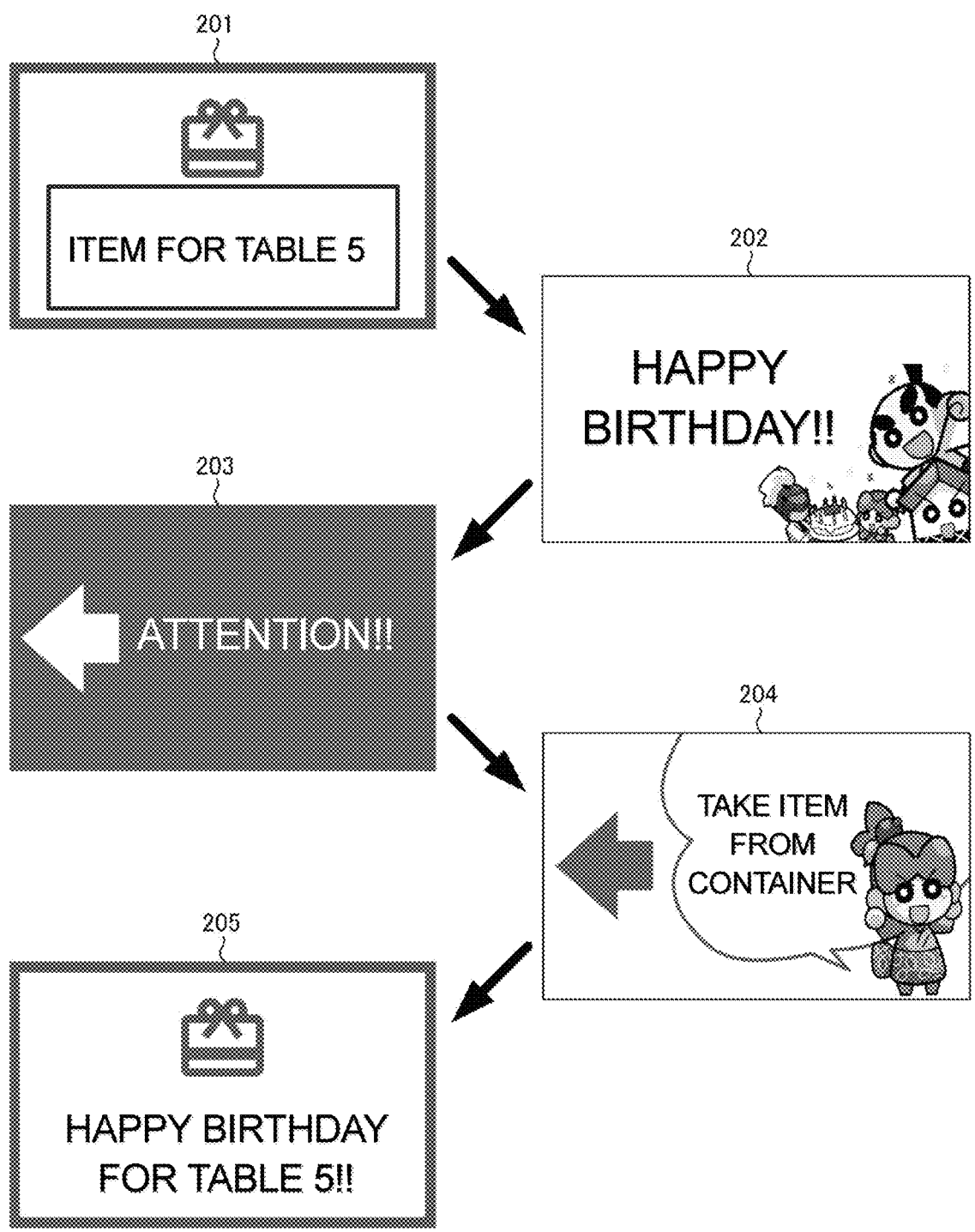
FIG. 18 is a diagram showing an example of an image displayed at an event by a display device of the restaurant management system according to the present embodiment.

Referring to FIG. 18, a specific example of the event image associated with the step of opening the lid 47 of the container 40 will be described. In the example shown in FIG. 18, a table notification image 201 indicating that an item for the table 104 (the fifth table in the example of FIG. 18) for which the event will be performed is being conveyed is displayed on the display device 70 at a timing before the container 40 reaches the table 104 for which the event will be performed. Accordingly, the customer of the table 104 who is not a target customer for the event can easily recognize the table 104 where the event will be performed from the table notification image 201. The table notification image 201 is one example of a pre-event image that is displayed before the event image is displayed.

When the display device 70 and the container 40 reach the table 104 where the event is scheduled to be performed, the display device 70 displays the celebration image 202 (for example, at least one of a congratulatory message, diagram, picture, etc.) for celebrating the customer. In other words, in the example shown in FIG. 18, the celebration image 202 is initially displayed as the event image. Thereafter, on the display device 70, the attention guiding image 203 (e.g., at least one of a message, a diagram, a picture, etc.), which is the event image to prompt the customer to pay attention to the container 40, is displayed before the lid 47 is opened. As shown in FIG. 18, the attention guiding image 203 may include an arrow or the like indicating the direction in which the container 40 is located with respect to the display device 70.

In the example shown in FIG. 18, the timing of displaying the event image by the display device 70 and the timing of opening the lid 47 of the container 40 are adjusted in advance so that the lid 47 is opened after the attention guiding image 203 was displayed on the display device 70. After the lid 47 was opened, the display device 70 displays the taking-out guiding image 204 (e.g., at least one of a message, a diagram, a picture, etc.), which is the event image that prompts the customer to take the item form the container 40. Thereafter, when the container 40 passes through the table 104 where the event was performed and moves to the next table 104, the display device 70 displays the table notification image 205 indicating that the event was performed for the table 104 (the table 5 in the example of FIG. 18). The table notification image 205 is an example of a post-event image that is displayed after the event display was displayed.

In the above description, the configuration for displaying the event image associated with the step of opening the lid 47 of the container 40 was explained. However, the control unit 72 may generate audio sound from the speaker 75 in accordance with the contents of the displayed image. In this case, for example, if the image contains a message or the like, the control unit 72 may generate an audio sound with the same contents as the message or the like included in the image. It is also possible to generate only an audio sound from the speaker 75 without displaying the event image.

In addition, in the embodiment, an item and an image used for the event are selected by a customer. However, it is possible to apply the techniques exemplified in the present disclosure even if the event content, the item used in the event, and the image used in the event are fixed (i.e., not selectable). The event may also be triggered when a customer selects a particular item. Further, when a customer selects one content among the plurality of event contents, an event with the selected content may be performed. Alternatively, when a customer selects one image among a plurality of images, an event corresponding to the selected image may be performed.

(Post-Event Process)

Next, the post-event process executed by the restaurant management system 1 in the present embodiment will be described. In the present embodiment, the reservation management device 10 of the restaurant management system 1 executes the post-event process. However, other devices of the restaurant management system 1 (e.g., the restaurant terminal 30) may execute the post-event process. The reservation management device 10 in the present embodiment stores the reservation date designated by the customer in a storage device (e.g., the storage device 13 or the cloud storage 5, etc.) in association with the account of the customer in the communication tool used at the reservation management process (see FIG. 5). At the post-event process, the reservation management device 10 outputs, on the chat screen between the customer and the customer, re-visit solicitation information, on the date before predetermined days of the reservation date stored in the storage device, to prompt the customer to re-visit the restaurant next year after the event was performed.

The date (the reservation date) reserved by a customer may be the anniversary of the customer's family, etc. Accordingly, the reservation management device 10 stores the reservation date and outputs, on the chat screen, the re-visit solicitation information on the date before the predetermined days of the reservation date in the following year or later, so that the customer can be effectively solicited to visit the restaurant again on the anniversary or the like. In addition, by outputting the re-visit soliciting information on the chat screen for the reservation, the customer can make a reservation directly through the chat screen where the re-visit soliciting information is output. This makes it even more likely that customers will come back.

(Modifications)

The technology disclosed in the above embodiment is only one example. Thus, it is also possible to change the technique illustrated in the above embodiment. For example, it is possible to use only one of the plurality of configurations, processes, and technologies exemplified in the above implementation in a restaurant management system.

Also, in the above implementation, the event execution device capable of performing an event on the conveying path 102 starts the event on the conveying path 102 by the event execution device at the timing at which the event execution device reaches the customer's seat on the conveying path 102. However, the restaurant management system 1 may control the timing at which the image is displayed on the display device disposed at the customer's seat (for example, the order acceptance terminal 38 in the above embodiment). For example, the restaurant management system 1 may start displaying an image by the display device disposed at the seat of the customer who placed the order at the time at which an item ordered by the customer (not necessarily limited to the reserved item) reaches the seat of the customer on the conveying path 102. An image to be displayed on the display device may be an image uploaded from the customer terminal 20 used by the customer, or an image selected by the customer among from a plurality of images. In this case, the event with the image selected by the customer starts at the appropriate timing at which the item ordered by the customer reaches the customer's seat. Therefore, the customers who visit the restaurant can be fully entertained. It should be noted that even in this case, it is possible to implement at least a portion of the plurality of configurations, processes, and techniques exemplified in the above-described embodiment in combination.

In the above embodiment, the time at which the reserved item is provided to the customer is determined according to the type of the reserved item. However, it is also possible to change the method for determining the time of providing the reserved item. For example, the reservation management device 10 may output, on the chat screen, designation request information requesting the customer to specify the timing of providing the reserved item (for example, specify a time period from the timing of visiting the restaurant and the timing of providing the reserved item). In this case, it will be easier for the restaurant to provide a customer with a reserved item appropriately at a predetermined timing. In addition, the order acceptance terminal 38 may accept an instruction by a customer to specify a providing timing to provide the reserved item. The order acceptance terminal 38 may notify a staff of the providing timing. In this case, the customer who selected the reserved item may receive the reserved item at an appropriate timing by operating the order acceptance terminal 38.

Figure 5:
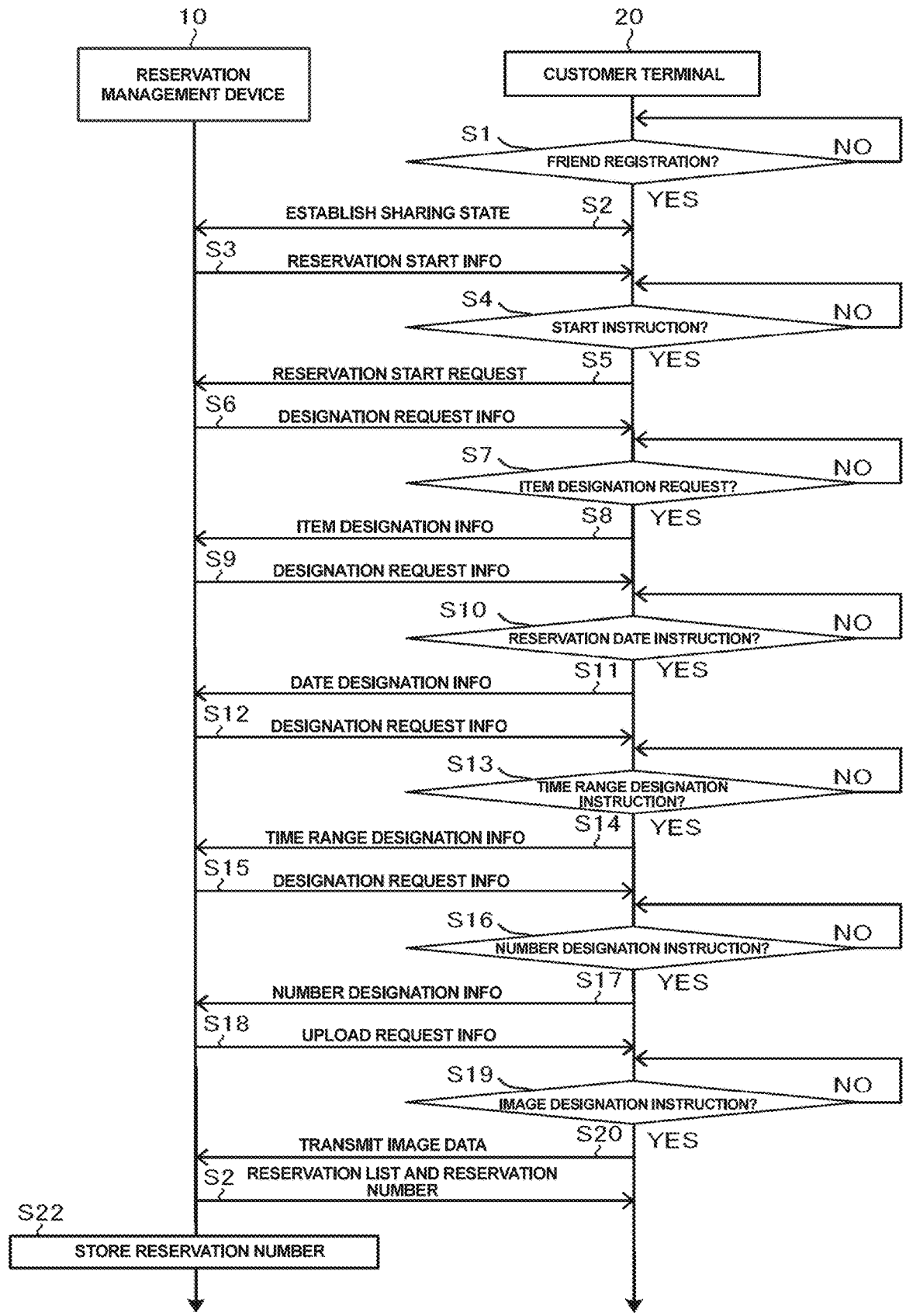
FIG. 5 is a timing chart of a reservation management process executed by the restaurant management system according to the present embodiment.

In the above embodiment, an item to be housed in the container 40 during the event is determined according to the reservation information (e.g., information on the reserved item) acquired at the reservation management process (see FIG. 5). In addition, the image uploaded by the customer in the reservation management process (see FIG. 5) is displayed on the display device 70 during the event. However, at least one of selecting the event contents (e.g., an item such as a present to be housed in the container 40 for the event) and selecting or uploading an image to be displayed on the display device 70 during the event may be done through a terminal disposed in the restaurant (e.g., the order reception terminal 38 disposed at the customer's seat, or the restaurant terminal 30). In this case, an event to be performed by the container 40 when the container 40 passes through the seat of the target customer may be, for example, at least one of the following events: an event where the lid 47 of the container 40 housing the item selected by the customer is opened, an event where the display device 70 displays an image selected or uploaded by the customer, and an event where the speaker 75 plays an audio sound selected or uploaded by the customer. In addition, as described above, instead of an event where the display device 70 displays an image selected or uploaded by the customer, an event where the display device 70 displays a prepared image for the event may be executed. In addition, the restaurant management system 1 may perform an event illustrated in FIGS. 17 and 18 without using the reservation information acquired at the reservation management process (see FIG. 5).

In the above embodiment, an event is performed when the container 40 on the conveying path 102 passes through the seat of the target customer. However, it is also possible to change the way of performing the event. For example, the restaurant management system may include a serving robot that can move around a restaurant floor. In this case, when the serving robot arrives at the seat of the target customer, an image (may be a video or a still image) selected or uploaded by the customer may be displayed on the display device. The display device may be a touch panel disposed at the customer's seat or a display device of the serving robot. The image may be uploaded in advance at the reservation management process (see FIG. 5), or may be selected or uploaded by the customer when visiting the restaurant.

In the above embodiment, the timer is set when the event execution device (at least one of the speaker 75, the display device 70, and the container 40) is placed on the conveying path 102 at the predetermined setting position. By performing the event when the timer has counted up, the event is performed when the event execution device reaches the seat of the target customer. However, it is also possible to change the method for performing an event when the event execution device reaches the seat of the target customer. For example, the restaurant management system may include a detection unit (e.g., a sensor that reads an identifier provided on the container 40, or other sensors, etc.) that detects the event execution device arriving at the target seat. The restaurant management system may start the event at a time at which the detection unit detects that the event execution device has reached the seat of the target customer (for example, the seat indicated by the seat information). The detection result by the detection unit may be output to at least one of the open control unit 60 and the control unit (which also serves as the display control unit and the voice control unit) 72 by wireless communication or wired communication, etc. In this case, the event starts at an appropriate timing without setting a timer. Also, the lid opening member for opening the lid 47 of the container 40 may be disposed close to each of the plurality of seats. The lid opening member provided at the seat of the target customer may cause the lid to be opened when the container 40 reaches the seat.

It should be noted that the process of establishing the sharing state of the chat screen at S1 and S2 of FIG. 5 is an example of a "sharing establishment step". The process of outputting the designation request information in S6, S9, S12, and S15 of FIG. 5 is an example of a "designation request step." The process of accepting the designation of the reservation contents in S7, S10, S13, S16 of FIG. 5 is an example of a "designation acceptance step". The process of outputting the image upload request information in S18 of FIG. 5 is an example of an "upload request step." The process of transmitting image data in S19, S20 of FIG. 5 is an example of an "image data transmission step". The process of accepting input of the inquiry text at S30 in FIG. 12 is an example of an "inquiry acceptance step." The process of automatically outputting an answer in S32, S33 of FIG. 12 is an example of an "automatic answer step." The customer reception process shown in FIG. 14 is an example of a "customer visit information output step." The process of controlling the display of the image in S50, S51 of FIG. 17 is an example of a "display start step". The process of opening the lid 47 at S60, S61 in FIG. 17 is an example of a "lid opening step."

The above-described disclosure may include the following technical features.

<1> A restaurant management system, comprising:
 a customer terminal that is used by a customer; and
 a reservation management device that is configured to manage reservations for a restaurant, wherein
 the customer terminal is configured to execute:
  a sharing establishment step of establishing a sharing state in a communication tool where information is output from a plurality of accounts and shared on a chat screen, wherein information is shared on the chat screen between the customer terminal and an account of the reservation management device in the sharing state; and
  a designation acceptance step of receiving, on the chat screen, designations by the customer on a plurality of reservation contents when the reservation management device sequentially outputs, on the chat screen, a plurality of pieces of designation request information for requesting the customer to designate each of the reservation contents regarding at least a reservation date and time, a number of people, and a reserved item, and
 a plurality of pieces of reservation information indicative of the plurality of reservation contents received at the designation acceptance step are acquired by sequentially accepting the designations on the plurality of reservation contents at the designation acceptance step.

<2> The restaurant management system according to <1>, wherein
 the designation request information output on the chat screen by the reservation management device includes a plurality of selection candidates for the reservation date and time, the number of people, and the reserved item, and
 at the designation acceptance step, the customer terminal receives the designations on the reservation date and time, the number of people, and the reserved item from the customer by receiving a selection instruction for selecting at least one of the plurality of selection candidates displayed on the chat screen.

<3> The restaurant management system according to <2>, wherein
 the reservation management device or the customer terminal is further configured to execute a reservation content output step of outputting the reservation contents corresponding to a selected candidate on the chat screen when the selection instruction of selecting at least one of the plurality of selection candidates is accepted at the designation acceptance step.

<4> The restaurant management system according to <2>, wherein
 the reservation management device is further configured to execute a candidate switching process of switching the plurality of selection candidates for at least one of the reservation date and time, the number of people, and the reserved item to other selection candidates on the chat screen in response to the customer operating an operation unit.

<5> The restaurant management system according to <1>, wherein
 the customer terminal is further configured to execute an image data transmission step of transmitting, to the reservation management device, image data that is designated by the customer in response to upload request information displayed on the chat screen by the reservation management device, and the upload request information is information requesting the customer to upload the image data that is to be provided to the customer in the restaurant.

<6> The restaurant management system according to <5>, wherein the upload request includes information explaining procedure for uploading the image data using the customer terminal.

<7> The restaurant management system according to <5>, wherein the restaurant includes:
  a conveying path that extends along seats for customers and is configured to convey an item;
  a display device that is conveyed on the conveying path and is configured to display an image based on the image data transmitted to the reservation management device at the image data transmission step; and
  a display control unit that is configured to control the display device to display the image,
a seat is assigned to the customer who made a reservation when the customer comes to the restaurant,
seat information indicative of the seat assigned to the customer is associated with the reservation information acquired at the designation acceptance step, and
the display control unit is configured to execute, based on the seat information, a display start step of controlling the display device to start displaying the image uploaded by the customer at a timing at which the display device conveyed on the conveying path reaches the seat assigned to the customer.

<8> The restaurant management system according to <7>, wherein:

the display control unit is further configured to, at the display start step: set a timer with a time necessary for the display device conveyed on the conveying path to reach the seat indicated by the seat information; and control the display device to start displaying the image when the timer counts up the set time.

<9> The restaurant management system according to <1>, wherein a plurality of accounts of the reservation management device are created for a plurality of restaurants,
information is sharable between each of the plurality of accounts of the reservation management device and the customer terminal at the sharing establishment step, and data for outputting the designation request information on the chat screen is stored in database for each of the plurality of restaurants.

<10> The restaurant management system according to <1>, wherein the reservation management device is further configured to execute an inquiry acceptance step of accepting inquiry text from the customer through the chat screen after the designation acceptance step for the plurality of reservation contents was completed.

<11> The restaurant management system according to <10>, wherein the reservation management device is further configured to execute an automatic response step of automatically outputting a response to the inquiry text on the chat screen based on the inquiry text accepted at the inquiry acceptance step.

<12> The restaurant management system according to <1>, wherein the reservation management device is further configured to:
  store the reservation date and time in association with an account of the customer in a storage device; and
  output, on the chat screen of the customer, re-visit soliciting information soliciting the customer to re-visit the restaurant on a date of a next year predetermined days before the stored reservation date.

<13> The restaurant management system according to <1>, further comprising a restaurant terminal that is disposed in the restaurant to manage a situation of a customer who comes to the restaurant, wherein
the restaurant terminal is configured to execute:
  a reservation information acquisition step of acquiring the reservation information acquired at the designated acceptance step; and
  a customer reception step of:
    associating, with the reservation information for the customer, seat information indicative of a seat assigned to the customer who made a reservation indicated by the reservation information when the customer comes to the restaurant; and
    outputting customer visit information including the seat information and information of the reserved item included in the reservation information.

<14> The restaurant management system according to <13>, wherein the restaurant terminal is further configured to:
  determine a time of providing the reserved item to the customer according to a visit time of the customer who made the reservation indicated by the reservation information and a type of the reserved item indicated by the reservation information; and
  include information indicative of the determined time in the customer visit information.

<15> The restaurant management system according to <1>, wherein the restaurant includes:
  a conveying path that extends along seats for customers and is configured to convey an item;
  a container that is conveyed on the conveying path and includes a lid, the container housing an item when the lid is closed;
  a lid opening member that is configured to open the lid of the container; and
  an open control unit that is configured to control the lid opening member, wherein
a seat is assigned to the customer who made a reservation when the customer comes to the restaurant,
seat information indicative of the seat assigned to the customer is associated with the reservation information acquired at the designation acceptance step, and
the open control unit is configured to, based on the seat information,
a lid opening step of controlling the lid opening member to open the lid of the container at a timing at which the container conveyed on the conveying path reaches the seat assigned to the customer.

<16> The restaurant management system according to <15>, wherein
the open control unit is further configured to, at the lid opening step:
set a timer with a time necessary for the container conveyed on the conveying path to reach the seat indicated by the seat information; and
control the lid opening member to open the lid when the timer counts up the set time.

<17> The restaurant management system according to <15>, wherein
the container houses the reserved item indicated by the reservation information associated with the seat information.

<18> A restaurant management system that manages a restaurant, the restaurant management system comprising:
a conveying path that extends along seats for customers in the restaurant and is configured to convey an item;
an event execution device that is conveyed on the conveying path in the restaurant and is configured to perform an event on the conveying path; and
an event control unit that is configured to control the event execution device to perform the event, wherein
a seat is assigned to a customer who made a reservation when the customer comes to the restaurant,
seat information indicative of the seat assigned to the customer is associated with reservation information indicative of a plurality of reservation contents for at least a reservation date and time and a number of people,
the reservation information is acquired in response to the customer inputting an instruction into a customer terminal used by the customer, and
the event control unit is configured to execute, based on the seat information, an event start step of controlling the event execution device that is conveyed on the conveying path to start the event on the conveying path when the event execution device reaches the seat assigned to the customer.

<19> A restaurant management system that manages a restaurant, the restaurant management system comprising:
a conveying path that extends along seats for customers in the restaurant and is configured to convey an item;
an event execution device that is conveyed on the conveying path in the restaurant and is configured to perform an event on the conveying path; and
an event control unit that is configured to control the event execution device to perform the event, wherein
the event control unit is configured to execute an event start step of controlling the event execution device that is conveyed on the conveying path to start the event on the conveying path when the event execution device reaches a seat for which the event is to be performed.

<20> A restaurant management method executed in a restaurant management system including a customer terminal used by a customer and a reservation management device that manages reservations for a restaurant, the restaurant management method comprising:
a sharing establishment step of establishing, with the customer terminal, a sharing state in a communication tool where information is output from a plurality of accounts and shared on a chat screen, wherein information is shared on the chat screen between the customer terminal and an account of the reservation management device in the sharing state; and
a designation request step of sequentially outputting, with the reservation management device, a plurality of pieces of designation request information requesting the customer to specify each of a plurality of reservation contents for at least a reservation date and time, a number of people, and a reserved item on the chat screen;
a designation acceptance step of accepting, with the customer terminal, designations by the customer on the plurality of pieces of the designation request information on the chat screen when the plurality of pieces of the designation request information are output on the chat screen; and
a reservation information storage step of acquiring, with the reservation management device, reservation information indicative of the plurality of reservation contents received at the designation acceptance step and of storing, with the reservation management device, the reservation information in a storage device, wherein
a plurality of pieces of the reservation information are acquired by the reservation management device by sequentially executing the designation request step and the designation acceptance step on each of the plurality of reservation contents.

<21> A restaurant management method executed by a restaurant management system that manages a restaurant, the restaurant management system including:
a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event, a seat is assigned to a customer who made a reservation when the customer comes to the restaurant, the restaurant management method comprising:
associating seat information indicative of the seat assigned to the customer with reservation information indicative of a plurality of reservation contents for at least a reservation date and time and a number of people, wherein the reservation information is acquired in response to the customer inputting an instruction into a customer terminal used by the customer; and
executing, with the event control unit based on the seat information, an event start step of controlling the event execution device that is conveyed on the conveying path to start the event on the conveying path when the event execution device reaches the seat assigned to the customer.

<22> A restaurant management method executed by a restaurant management system that manages a restaurant, the restaurant management system including: a conveying path that extends along seats for customers in the restaurant and is configured to convey an item; an event execution device that is conveyed on the conveying path in the restaurant and is configured to perform an event on the conveying path; and an event control unit that is configured to control the event execution device to perform the event, the restaurant management method comprising
executing, with the event control unit, an event start step of controlling the event execution device that is conveyed on the conveying path to start the event on the conveying path when the event execution device reaches a seat for which the event is to be performed.

<23> A reservation management device that manages reservations for a restaurant, the reservation management device comprising:
at least one processor; and
at least one memory storing computer program code, wherein
the computer program code, when executed by the at least one processor, causing the at least one processor to execute:
a sharing establishment step of establishing a sharing state in a communication tool where information is output from a plurality of accounts and shared on a chat screen, wherein information is shared on the chat screen between the customer terminal and an account of the reservation management device in the sharing state;
a designation request step of sequentially outputting, with the reservation management device, a plurality of pieces of designation request information on the chat screen, the plurality of pieces of designation request information requesting the customer to specify each of a plurality of reservation contents for at least a reservation date and time, a number of people, and a reserved item;
a designation result acquisition step of acquiring a designation result of each of a plurality of reservation contents received by a customer terminal used by the customer on the chat screen each time each of the plurality of pieces of designation request information is displayed on the chat screen; and
a reservation information storage step of storing, in a storage device, reservation information indicative of the designation result of each of the plurality of reservation contents acquired at the result acquisition step, wherein
a plurality of pieces of the reservation information are acquired by sequentially executing the designation request step and the designation result acquisition step on each of the plurality of reservation contents.

<24> A non-transitory, computer readable, storage medium storing a reservation management program executed in a reservation management device that manages reservations of a restaurant, the reservation management program, when executed by a control unit of the reservation management device, causing the control unit to execute:
a sharing establishment step of establishing a sharing state in a communication tool where information is output from a plurality of accounts and shared on a chat screen, wherein information is shared on the chat screen between the customer terminal and an account of the reservation management device in the sharing state;
a designation request step of sequentially outputting, with the reservation management device, a plurality of pieces of designation request information on the chat screen, the plurality of pieces of designation request information requesting the customer to specify each of a plurality of reservation contents for at least a reservation date and time, a number of people, and a reserved item;
a designation result acquisition step of acquiring a designation result of the plurality of reservation contents received by a customer terminal used by the customer on the chat screen when the plurality of pieces of designation request information are displayed on the chat screen; and
a reservation information storage step of storing, in a storage device, reservation information indicative of the designation result of the plurality of reservation contents acquired at the result acquisition step, wherein
a plurality of pieces of the reservation information are acquired by sequentially executing the designation request step and the designation result acquisition step on each of the plurality of reservation contents.

The invention claimed is:

1. A restaurant management system that manages a restaurant, the restaurant management system comprising:
a conveying path that extends along seats for customers in the restaurant and is configured to convey an item;
an event execution device that is conveyed on the conveying path in the restaurant and is configured to perform one or more events on the conveying path, wherein the one or more events are prepared in advance of a customer reaching a seat, of the seats, on the conveying path; and
an event control unit that is configured to control the event execution device to perform an event, of the one or more of events, in response to a request by the customer, wherein
the event execution device includes a display device that is configured to display a particular image, wherein the particular image is determined: in response to the customer selecting one of the one or more of events via a terminal, and in accordance with the selected event; and
the event control unit executes an event start step of controlling the display device that is conveyed on the conveying path to display the determined particular image, as the selected event, on the conveying path when the event execution device reaches the seat for which the selected event is performed.

2. The restaurant management system according to claim 1, wherein the particular image is determined in response to the customer operating a customer terminal of the customer when the customer makes a reservation for the restaurant.

3. The restaurant management system according to claim 1, wherein the particular image is determined in response to the customer operating a restaurant terminal in the restaurant when the customer is in the restaurant.

4. The restaurant management system according to claim 1, wherein
the event execution device further includes a container with a lid being selectively opened and closed, the container being configured to house an item for the event, and
the event control unit is further configured to open the lid when the event execution device is conveyed to reach the seat for which the event is to be performed.

5. The restaurant management system according to claim 4, wherein
the container is not transparent, and
the item for the event housed in the container is invisible from an outside of the container when the lid is closed.

6. A restaurant management method executed by a restaurant management system that manages a restaurant, the restaurant management system including:
a conveying path that extends along seats for customers in the restaurant and is configured to convey an item;

an event execution device that is conveyed on the conveying path in the restaurant and is configured to perform one or more events on the conveying path, wherein the event execution device includes a display device that is configured to display a particular image; and an event control unit that is configured to control the event execution device;

wherein the restaurant management method comprises:

performing the one or more events on the conveying path, by the event execution device that is conveyed on the conveying path in the restaurant, wherein the one or more events are prepared in advance of a customer reaching a seat, of the seats, on the conveying path;

controlling, by the event control unit, the event execution device to perform an event, of the one or more events, in response to a request by the customer;

determining the particular image to display on the display device: in response to the customer selecting one of the one or more events via a terminal, and in accordance with the selected event; and executing, with the event control unit, an event start step of controlling the display device that is conveyed on the conveying path to display the determined particular image, as the selected event, on the conveying path when the event execution device reaches the seat for which the selected event is performed.

7. The restaurant management method according to claim 6, wherein the particular image is determined in response to the customer operating a customer terminal of the customer when the customer makes a reservation for the restaurant.

8. The restaurant management method according to claim 6, wherein the particular image is determined in response to the customer operating a restaurant terminal in the restaurant when the customer is in the restaurant.

9. The restaurant management method according to claim 6 wherein the event execution device further includes a container with a lid being selectively opened and closed, the container being configured to house an item for the event, and the restaurant management method further comprises opening, with the event control unit, the lid when the event execution device is conveyed to reach the seat for which the event is to be performed.

10. The restaurant management method according to claim 9, wherein the container is not transparent, and the item for the event housed in the container is invisible from an outside of the container when the lid is closed.

11. A non-transitory, computer readable, storage medium storing a restaurant management program for a restaurant management system that manages a restaurant, the restaurant management system including:

a conveying path that extends along seats for customers in the restaurant and is configured to convey an item;

an event execution device that is conveyed on the conveying path in the restaurant and is configured to perform one or more events on the conveying path, wherein the event execution device includes a display device that is configured to display a particular image; and an event control unit that is configured to control the event execution device:

wherein the restaurant management program, when executed by at least one processor of the restaurant management system, causing the at least one processor to perform a restaurant management method comprising:

performing the one or more events on the conveying path, by the event execution device that is conveyed on the conveying path in the restaurant, wherein the one or more events are prepared in advance of a customer reaching a seat, of the seats, on the conveying path;

controlling, by the event control unit, the event execution device to perform an event, of the one or more events, in response to a request by the customer;

determining the particular image to display on the display device: in response to the customer selecting one of the one or more events via a terminal, and in accordance with the selected event; and performing an event start step, with the event control unit, of controlling the display device that is conveyed on the conveying path to display the determined particular image, as the selected event, on the conveying path when the event execution device reaches the seat for which the event is performed.

* * * * *

UNITED STATES PATENT AND TRADEMARK OFFICE
CERTIFICATE OF CORRECTION

| | | |
|---|---|---|
| PATENT NO. | : 12,482,044 B1 | Page 1 of 1 |
| APPLICATION NO. | : 18/914055 | |
| DATED | : November 25, 2025 | |
| INVENTOR(S) | : Kunihiko Tanaka | |

It is certified that error appears in the above-identified patent and that said Letters Patent is hereby corrected as shown below:

On the Title Page

In the Foreign Application Priority Data, insert the following:
--(30) Foreign Application Priority Data
July 2, 2024 (JP) 2024-106717
August 28, 2024 (JP) 2024-146240--

Signed and Sealed this
Twenty-seventh Day of January, 2026

John A. Squires
*Director of the United States Patent and Trademark Office*